United States Patent [19]
Comer

[11] Patent Number: 5,873,043
[45] Date of Patent: Feb. 16, 1999

[54] SYSTEM FOR COMMUNICATING MESSAGES VIA A FORWARD OVERHEAD CONTROL CHANNEL

[75] Inventor: Edward Irby Comer, Marietta, Ga.

[73] Assignee: Cellemetry LLC, Atlanta, Ga.

[21] Appl. No.: 769,142

[22] Filed: Dec. 18, 1996

[51] Int. Cl.$^6$ .................................................. H04Q 7/20
[52] U.S. Cl. ..................... 455/458; 455/466; 455/434; 370/474; 370/913
[58] Field of Search ...................................... 455/458, 515, 455/31.3, 422, 426, 466, 434; 340/825.44, 311.1; 370/328, 329, 349, 389, 913, 394, 912, 471, 343, 474

[56] References Cited

U.S. PATENT DOCUMENTS

| | | |
|---|---|---|
| 3,973,200 | 8/1976 | Akerberg . |
| 4,172,969 | 10/1979 | Levine et al. . |
| 4,263,480 | 4/1981 | Levine . |
| 4,644,351 | 2/1987 | Zabarsky et al. . |
| 4,646,082 | 2/1987 | Engel et al. . |
| 4,750,197 | 6/1988 | Denekamp et al. . |
| 4,814,763 | 3/1989 | Nelson et al. . |
| 4,823,123 | 4/1989 | Siwiak . |
| 4,825,193 | 4/1989 | Siwiak et al. . |
| 4,825,457 | 4/1989 | Lebowitz et al. . |
| 4,837,800 | 6/1989 | Freeburg et al. . |
| 4,868,560 | 9/1989 | Oliwa et al. . |

(List continued on next page.)

FOREIGN PATENT DOCUMENTS

WO 97/36435  10/1997  WIPO .

OTHER PUBLICATIONS

European Telecommunication Standard—Draft pr ETS 300 537, "European Digital Cellular Telecommunications System (Phase 2); Technical Realization of Short Message Service Call Broadcast (SMSCB)", European Telecommunications Standards Institute, Oct. 1993.

European Telecommunication Standard—Draft pr ETS 300 536, "European Digital Cellular Telecommunications System (Phase 2); Technical Realization of the Short Message Service (SMS) Point to Point (PP)", European Telecommunications Standards Institute, Oct. 1993.

The GSM System for Mobile Communications, Michel Mouly and Marie–Bernadette Pautet ISBN: 2–9507190–0–7, ©1992; pp, 56–59.

"Mobile Cellular Telecommunications Systems", William C.Y. Lee, pp. 74–80, 1989.

*Primary Examiner*—Dwayne D. Bost
*Assistant Examiner*—Tracy M. Legree
*Attorney, Agent, or Firm*—Jones & Askew, LLP

[57] ABSTRACT

A system for communicating multiple page messages or pages via a forward overhead control channel (FOCC) of a cellular network control channel to a cellular-compatible receiving device and combining the data obtained from each received page to form an aggregate message comprising a data sequence. A cellular communications device operating in a normal state responds to a page received via the FOCC by comparing the received page to one or more masks maintained in its memory. If the received page contains a predetermined characteristic and matches a corresponding mask maintained by the receiving device, then it responds by transitioning from a normal state to a receive device identifier state. In the receive device identifier state, the cellular communications device monitors the FOCC for a page having a special identifier assigned to that device. Each received page is compared to a mask corresponding to the special identifier and maintained in memory of the selected device. In response to a match, the cellular communications device transitions from the receive device identifier state to a receive data state and operates to monitor the FOCC for pages containing commands. In the receive data state, the cellular communications device can respond to pages containing commands by accepting data values for each received command page and combining the data values to form a data sequence.

52 Claims, 7 Drawing Sheets

U.S. PATENT DOCUMENTS

| | | |
|---|---|---|
| 4,875,038 | 10/1989 | Siwiak et al. . |
| 4,882,579 | 11/1989 | Siwiak et al. . |
| 4,891,637 | 1/1990 | Siwiak et al. . |
| 4,905,234 | 2/1990 | Childress et al. ............ 370/913 |
| 4,914,651 | 4/1990 | Lusignan . |
| 4,928,096 | 5/1990 | Leonardo et al. . |
| 4,940,963 | 7/1990 | Gutman et al. . |
| 4,993,059 | 2/1991 | Smith et al. . |
| 5,005,014 | 4/1991 | Jasinski et al. . |
| 5,047,763 | 9/1991 | Kuzniki et al. . |
| 5,117,449 | 5/1992 | Metroka et al. . |
| 5,124,697 | 6/1992 | Moore . |
| 5,142,279 | 8/1992 | Jasinski et al. . |
| 5,148,473 | 9/1992 | Freeland et al. . |
| 5,153,582 | 10/1992 | Davis . |
| 5,153,903 | 10/1992 | Eastmond et al. . |
| 5,159,625 | 10/1992 | Zicker . |
| 5,162,790 | 11/1992 | Jasinski . |
| 5,175,758 | 12/1992 | Levanto et al. . |
| 5,218,367 | 6/1993 | Sheffer et al. ............ 342/457 |
| 5,222,123 | 6/1993 | Brown et al. . |
| 5,239,294 | 8/1993 | Flanders et al. . |
| 5,239,678 | 8/1993 | Grube et al. . |
| 5,307,399 | 4/1994 | Dai et al. . |
| 5,307,509 | 4/1994 | Michalon et al. . |
| 5,341,410 | 8/1994 | Aron et al. . |
| 5,382,970 | 1/1995 | Kiefl . |
| 5,396,537 | 3/1995 | Schwendeman ............ 455/31.3 |
| 5,396,539 | 3/1995 | Slekys et al. . |
| 5,404,392 | 4/1995 | Miller et al. . |
| 5,454,027 | 9/1995 | Kennedy et al. . |
| 5,493,722 | 2/1996 | Gunn et al. ............ 455/54.1 |
| 5,511,072 | 4/1996 | Delprat ............ 370/68.1 |
| 5,511,110 | 4/1996 | Drucker ............ 455/458 |
| 5,526,401 | 6/1996 | Roach, Jr. et al. . |
| 5,528,664 | 6/1996 | Slekys et al. ............ 379/58 |
| 5,539,810 | 7/1996 | Kennedy, III et al. . |
| 5,544,225 | 8/1996 | Kennedy, III et al. . |
| 5,546,444 | 8/1996 | Roach, Jr. et al. . |
| 5,594,740 | 1/1997 | LaDue . |
| 5,596,573 | 1/1997 | Bertland ............ 370/474 |
| 5,625,889 | 4/1997 | Chikkaswamy et al. ............ 455/67.1 |
| 5,652,570 | 7/1997 | Lepkofker ............ 340/573 |
| 5,686,888 | 11/1997 | Welles, II et al. ............ 340/539 |
| 5,701,302 | 12/1997 | Geiger ............ 370/521 |
| 5,781,612 | 7/1998 | Choi et al. ............ 455/426 |
| 5,794,144 | 8/1998 | Comer ............ 455/426 |
| 5,805,997 | 9/1998 | Farris ............ 455/461 |

SYSTEM FOR COMMUNICATING MESSAGES VIA A FORWARD OVERHEAD CONTROL CHANNEL

RELATED APPLICATIONS

The present application is directed to subject matter that is related to U.S. patent application Ser. No. 08/212,039, filed on Mar. 11, 1994, now issued as U.S. Pat. No. 5,546,444, and to U.S. patent application Ser. No. 08/331,794, filed on Oct. 31, 1994, now issued as U.S. Pat. No. 5,526,401.

TECHNICAL FIELD

The present invention relates generally to data communications systems and more particularly relates to a system for communicating a message by sending a sequence of pages via a forward overhead control channel of a cellular network control channel for a cellular mobile radiotelephone system.

BACKGROUND OF THE INVENTION

In recent years, the communications industry has shown a growing interest in various types of wireless communications systems for communicating voice and/or data between numerous remote sites and a central location. It is well recognized that the use of a dedicated telephone facility for a conventional telephone system is not a convenient or economical option for all communications applications. For example, for many industrial applications, a central data collection site has a need for acquiring information from a variety of remotely located monitoring devices that collect data about the operation or performance of equipment. To overcome the limitations of the conventional telephone system, a two-way wireless communications link is often necessary to permit a response to a communication initiated from another location. In an attempt to solve the problem of supplying a response to an initial communication, the industry has offered various wireless communications systems, including two-way radios, cellular mobile radiotelephones, and paging systems.

A conventional radio communications system uses a base station transceiver located at a site for favorable radio propagation and a set of transceivers typically located in vehicles, such as for police or trucking dispatching systems, or at remote equipment sites that communicate data in response to a command signal from the base station transceiver. Most radio communications systems are useful for conducting communications between short distances, such as within the boundaries of a town or city, via a very high frequency (VHF) radio link.

Although conventional radio communications systems are useful for specialized communications applications, two-way radios are not widely accepted for general purpose communications. The use of two-way radios is generally regulated by the Federal Communications Commission (FCC) and the allocated frequency spectrum is relatively limited. Furthermore, the quality of communications is subject to the propagation conditions between communications sites. Two-way radio equipment is generally large and heavy and, as a result, is unlikely to be carried by a user at all times or to be installed in small or existing equipment.

Another form of two-way communications is a cellular mobile radiotelephone (CMR) system, which is connected to the extensive public switched telephone network (PSTN) and permits communications between a mobile radiotelephone user and anyone with a conventional telephone (or another radiotelephone). Typical CMR systems are characterized by dividing a radio coverage area into smaller coverage areas or "cell" using low power transmitters and coverage-restricted receivers. The limited coverage area enables the radio channels used in one cell to be reused in another cell. As a cellular mobile radiotelephone within one cell moves across the boundary of the cell and into an adjacent cell, control circuitry associated with the cells detects that the signal strength of the radiotelephone in the just-entered cell is stronger, and communications with the radiotelephone are "handed-off" to the just-entered cell. Thus, a CMR system can supply two-way communications for an array of cells, thereby supplying communications for a much wider area than conventional two-way radios.

Conventional radiotelephones generally offer both voice and data communications capabilities and, accordingly, the radiotelephone service is generally supplied at a cost that is commensurate with combined voice and data services. Nevertheless, this combination of both voice and data communications may exceed a user's requirement for communicating by only voice or data. In addition, real-time voice or data communications is not always desirable by a user who wishes only to receive a message without having a current activity disturbed. Similar to two-way radios, the frequency spectrum for the CMR system radio channels, particularly voice channels, is a limited resource.

Radiopaging systems include pagers, which are miniature receivers, and at least one radiopaging terminal having a transmitter that covers a selected geographic area containing numerous pagers. To respond to a page received via the conventional one-way radiopaging system, the paged party typically must find an available conventional telephone and initiate a telephone call to the party that initiated the page. Alternatively, the paged party can place a responsive call by use of a mobile radiotelephone, if available. Radiopaging systems having two-way communications capability for receiving a page and transmitting an acknowledge receipt of a page are also known. Such paging acknowledgment systems are most useful for local area "on-site" communications systems in view of the power limitations of the transmitters associated with the pagers.

Present radiopaging acknowledgment systems require a large capital investment for the purchase and installation of equipment to implement a two-way communications system that covers a wide communications area because the number of acknowledgment receivers (and transmitters) is a function of the limited transmitting power of the transmitter associated with each of the pagers. Although the radiopaging industry is interested in supplying a page acknowledgment to subscribers of paging services, the cost of implementing the paging acknowledgment system has discouraged many service providers from installing such paging acknowledgment systems.

To overcome the limitations of prior communications systems, the assignee for the present invention has developed a system for communicating data via a cellular network control channel of a CMR system. U.S. Pat. Nos. 5,526,401 and 5,546,444, which are assigned to the assignee for the present application and contain subject matter fully incorporated herein by reference, describe an adapted use of the existing architecture of a CMR system in an efficient and cost-effective manner to support communications via the CMR system, including collection and reporting of data obtained at remote sites. A data message system includes data reporting devices, at least one mobile switching center (MSC), and a data collection system connected directly or indirectly to the MSC or a Signal Transfer Point (STP). Each data reporting device can monitor the operation of a remote data source to collect selected data. The data reporting device can transmit a data message containing the selected data via a cellular network control channel of the CMR system when the data reporting device first identifies itself or "registers" for operation with the MSC. Alternatively, the data reporting device can send the selected data via the cellular network control channel in a data message formatted to represent a "call origination" signal. In turn, the MSC can send the data message to the data collection system via a communications link. In this manner, the data message system takes advantage of an installed base of cellular communications equipment by using the cellular network control channel for data communications between a central location and one or more remote sites.

The data reporting device of the data message system typically communicates with the MSC via the reverse overhead control channel (RECC) of the cellular network control channel. In contrast, the MSC can communicate with a cellular-compatible device, such as a data reporting device, via the forward overhead control channel (FOCC) of the cellular network control channel. The conventional technique for sending a message to a cellular mobile radiotelephone from an MSC is the transmission of a page message over the FOCC. For example, a conventional cellular mobile radiotelephone can be stimulated by a transmission of the MSC to locate the mobile telephone unit when an incoming call from a landline has been placed to this unit. The data requirement for this type of trigger message is minimal for conventional cellular communications and, consequently, each message is independently processed as a complete data packet. This works well for the paging operations conducted by an MSC with conventional cellular mobile radiotelephones via the FOCC, but significantly limits the amount of information that can be provided by the MSC to a data reporting device of the data message system developed by the assignee of this application.

In view of the foregoing, there is a need for transmitting a data sequence that extends beyond the capacity of a single conventional paging message of a CMR system. There also exists a need for adapting the paging mechanism of a CMR system to support the transfer of commands and data that exceed the scope of transmission via a single discrete paging message. The present invention overcomes the limitations of the prior paging system of a CMR system by sending a sequence of paging messages that can be aggregated at the reception site to obtain an increased data capacity for communications from an MSC to a cellular-compatible device.

SUMMARY OF THE INVENTION

The present invention solves the problems of the prior art by providing a system for communicating a data sequence from a mobile switching center (MSC) to a cellular-compatible device via a cellular network control channel of a cellular mobile radiotelephone (CMR) system, without modifying the existing standard structure or format of the cellular network control channel. Telecommunications service suppliers, including a company related to the assignee of this application, BellSouth Mobility, have already installed the necessary equipment to support nationwide communications via CMR networks. The inventor has recognized that a CMR system represents an existing communications architecture which can be adapted in a novel manner to supply data communications with minimal impact upon the well known voice communications offered by the cellular mobile radiotelephone network. The present invention takes advantage of this installed base of communication equipment by using the control channel of the CMR system for data communications between a central location and one or more remote sites.

Briefly described, the operating environment for the present invention is a data message system for communicating data from data sources. The data message system includes a set of data reporting devices, at least one mobile switching center (MSC) of a CMR system, and a data collection system connected to the MSC. Each data reporting device includes a monitor and a cellular communications device. The monitor, which is typically connected to a remote data source, monitors the operation of the remote data source to obtain selected data. The cellular communications device is connected to a corresponding monitor and, in response to selected data, transmits a data message containing the selected data. The selected data can be communicated via a cellular network control channel of the CMR system when the cellular communications device first identifies itself or "registers" for operation with the MSC. Alternatively, the cellular communications device can send the selected data in a message formatted as a call origination signal. The MSC receives data messages from cellular communications devices operating within coverage areas of the CMR system. In turn, the MSC sends the data messages to the data collection system via a first communications link. The data collection system, which is connected to a memory storage device, stores each data message and thereafter processes the stored data messages.

The data collection system also can transmit the stored data message to a data processing system via a second communications link. The data processing system, which also operates to store and/or process the contents of the data message, is typically located at a site remote from the data collection system. This permits processing of selected data at a central location that is more convenient for the user, rather than conducting such operations at the location for the data collection system. Although the data collection system and the data processing system are typically located at separate sites, the operations of the data collection and the data processing system also can be combined or otherwise integrated by installing those systems at the same physical location.

The data message comprises selected data and a predetermined identifying characteristic that uniquely identifies the cellular communications device which transmits the data message to the MSC. The data message can be formatted to correspond to an identification signal, often referred to as a registration signal, which is normally transmitted by a cellular radiotelephone unit when the device first identifies itself to the CMR system. Alternatively, the data message can be formatted to correspond to a call origination signal, which is typically transmitted by a cellular radiotelephone unit when it originates a telephone call. The identification signal (call origination) normally comprises separate data fields containing a mobile telephone number (MIN) and an electronic serial number (ESN). Thus, the predetermined identifying characteristic is inserted within a data field that represents the mobile telephone number and the selected data is inserted within a data field that represents the ESN. Each cellular communications device is assigned a different predetermined identifying characteristic, which can be a conventional telephone number, a selected 10 digit number, or at least a portion of a mobile telephone number [XXX XXXXXXX] that belongs to a set of unassigned mobile telephone numbers of the CMR system. Alternatively, the MIN field can be an International Mobile Station Identity (IMSI), or portion thereof. The IMSI, which serves an identifying function similar to a MIN, is a predefined set of digits for identifying a cellular radiotelephone unit.

Turning now to a brief review of the present invention, a system is provided for communicating with a selected cellular communications device by sending multiple pages via a cellular network control channel of a CMR system. The cellular communications device normally monitors the cellular network control channel for discrete pages, also known as page messages, which are carried as digital data streams by the forward overhead control channel (FOCC) of the cellular network control channel. Pages typically include an address or identifier having an identifying characteristic. This address can be used to selectively communicate with a cellular communications device having that address or to cause one or more cellular communications devices to enter a certain operating state. A cellular communications device can recognize that a received page is targeted for itself by comparing the address of the page to one or more masks maintained in memory, typically non-volatile memory. A match typically determines the course of action to be taken by the cellular communications device in response to receiving the page. For example, a match may determine whether the cellular communications device will transition from the normal operating state to another operating state.

For the data reporting system, a cellular communications device can exit the normal state and subsequently enters a receive device identifier state in response to receiving a page having a predetermined characteristic. The cellular communications device determines that it has received a page containing a predetermined characteristic by monitoring the FOCC and by comparing the predetermined characteristic of the received page to a mask maintained in memory. A match resulting from this comparison indicates that a page having the predetermined characteristic has been received. The page containing the predetermined characteristic is typically formatted to represent at least a portion of the digits of a telephone number, also described as a MIN, for the CMR system.

In the receive device identifier state, each cellular communications device monitors the FOCC for a page having a specific identifier assigned to the corresponding cellular communications device. To determine if a page has been received that contains the assigned specific identifier, a comparison is conducted to examine whether the specific identifier matches a mask maintained in memory. A match resulting from this comparison indicates that the page contains the specific identifier and should be accepted by the cellular communications device. Typically, a set of masks can be stored in non-volatile memory for comparison to received pages. The page containing the specific identifier is typically formatted to represent at least a portion of the digits of a telephone number or MIN for the CMR system. To limit the time period for this monitoring operation, each cellular communications device can terminate the monitoring operation for a page containing the specific identifier and return to the normal state in the event a certain time period expires without receiving the page having the specific identifier.

If a selected cellular communications device receives a page having its specific identifier, the selected cellular communications device can enter the receive data state and begins to monitor the cellular network control channel for pages containing a command. In the event that the selected cellular communications device receives while in the receive data state pages containing a command, the data of each of these pages is accepted and combined to form an aggregate data message containing a sequence of the data. In other words, the data sequence is formed by combining the set of data obtained from the predetermined number of pages. The data sequence is typically ordered by placing the data set of each received command page within a sequence based on the order of reception. Alternatively, the data sequence can be ordered based on a sequence number assigned to each page.

Typical commands include the following control actions: (1) load busy idle bit (BIB) data values, wherein the data sequence comprises BIB data values; (2) set a predetermined time for a timer device connected to the selected cellular communications device, wherein the data sequence comprises timing data values corresponding to the predetermined time; and (3) accept data values contained in a certain portion of each command page, and provide the data sequence comprising the data values to a device external to the selected cellular communications device.

As will be described in more detail below with respect to FIG. 3, the cellular communications device can monitor BIB signals carried by the FOCC of the cellular network control channel to enable a determination of the amount of activity on the RECC for a monitored cell of the CMR system. The cellular communications device can delay sending a data message to a MSC until the level of activity on the RECC is below a threshold level. The BIB data values of the "load BIB" command define maximum and minimum thresholds levels for use by the cellular communications device during its monitoring operation.

To ensure quality data reception, the selected cellular communications device can respond to the reception of command pages by monitoring the cellular network control channel for a page containing a verification command. For example, the selected cellular communications device can enter a verification state in response to a page containing the verification command and after reception of a predetermined number of pages. The data sequence is verified to determine whether the data sequence was properly received by that cellular communications device. If verified, then the data sequence can be operated upon in accordance with the command provided by the received pages.

The data sequence can be discarded by the selected cellular communications device in the event that the data cannot be properly verified. Specifically, the data sequence is discarded if a verification term provided by the verification command does not match a verification value calculated with the data of the data sequence. The data sequence also can be discarded in the event that the verification command page is not received within a certain maximum time period.

The verification process can verify the data provided by command pages by calculating a verification value and comparing it to a verification term carried by the verification page. The verification value is calculated by summing each digit pair of data values of each page containing the command to produce a hex value-sum of all pages containing the command. The second least significant digit pair of the first page containing the command is then exclusive-or'ed with the hex value-sum of all pages containing the command to produce a exclusive-or'ed sum. The resultant value is converted from an exclusive-or'ed sum having a hex value into a sum having a decimal value. The calculated verification value is then compared to a verification term representing the data set of the page containing the verification command.

Outside of the verification process, the data sequence can be discarded by a cellular communications device in the event that a time period between any pair of received command pages exceeds a certain maximum time period. In addition, the data sequence can be discarded in response to receiving more than a predetermined number of pages containing the command while monitoring the cellular network control channel.

For another aspect of the present invention, a system is provided for communicating a message by sending a predetermined sequence of pages to a selected cellular communications device via the FOCC of a cellular network control channel of a CMR system. Each cellular communications device monitors for pages on the cellular network control channel while operating in the normal state. Each cellular communications device transitions from the normal state and enters a receive device identifier state (COMIN_RCV_DEVID state) in response to receiving one of the pages matching a first mask (COMIN-12) stored by each cellular communications device. A cellular communications device operating in the receive device identifier state can monitor the FOCC for pages containing commands.

A selected cellular communications device transitions from the receive device identifier state and enters the receive data state (COMIN_RCV_DATA state) in response to receiving a page that matches a second mask assigned to the selected cellular communications device. The selected cellular communications device operates in the receive data state to monitor the FOCC for pages containing commands. Each page containing a command is typically formatted to represent a telephone number or MIN having a set of digits in the format ABCDEddddx, wherein a portion of the digits (ABCDE) corresponds to the first mask, another portion of the digits (dddd) corresponds to data, and a remaining least significant digit (x) represents a command.

The selected cellular communications device can receive data while in the receive data state (COMIN_RCV_DATA state). Specifically, data can be acquired in response to receiving a predetermined number of command pages. Each of these command pages has a portion that matches the first mask and a least significant digit representing one of the commands.

The selected cellular communications device can transition from the receive data state (COMIN_RCV_DATA state) and enters the verification state (COMIN_VERIFY state) after (1) it receives the predetermined number of pages containing the command and (2) in response to receiving one of the pages having a portion that matches the first mask and a least significant digit representing a verification command. In the verification state, the selected cellular communications device verifies the accepted data. The verification task is completed by comparing a verification term of the verification page with a value calculated with the data provided by the pages containing commands. Upon verifying the received data, the selected cellular communications device can operate on the data sequence in accordance with the command.

The aspects of the present invention described above are directed to reception by one or more cellular-compatible devices selected from a set of such devices. This supports the selective communication of the data sequence formed by the combination of multiple pages. To achieve a general distribution of an extended data set, another aspect of the present invention supports the communication of multiple pages comprising the data sequence in broadcast fashion for reception by all cellular-compatible devices within the coverage area of the MSC for the CMR system. Specifically, a system is provided for communicating data between a MSC and a set of cellular communications devices operating within the scope of coverage for the CMR system. To send data from a cellular communications device to the MSC, the cellular communications device can transmit a data message containing selected data via the RECC of a cellular network control channel. The MSC can receive the data message and, in response, transmits the received data message to a data collection system via a first communications link. The data collection system can collect the selected data in response to receiving the data message.

The MSC can send pages, also called paging messages, to the set of cellular communications devices via the FOCC of the cellular network control channel. The cellular communications devices monitor the FOCC for a page having a predetermined characteristic. Each cellular communications device receiving a page having the predetermined characteristic can monitor the cellular network control channel for pages containing a command. In response to receiving a predetermined number of pages containing the command, each cellular communications device can accept data from the predetermined number of command pages. The data taken from these pages is combined to form an aggregate data message containing a sequence of the data. Consequently, the cellular network control channel can be used as a bidirectional communications link to transfer data between the MSC and cellular communications devices.

In view of the foregoing, these and other objects, features, and advantages of the present invention may be more clearly understood and appreciated from a review of the following detailed description and by reference to the appended drawings and claims.

DETAILED DESCRIPTION

Figure 1:
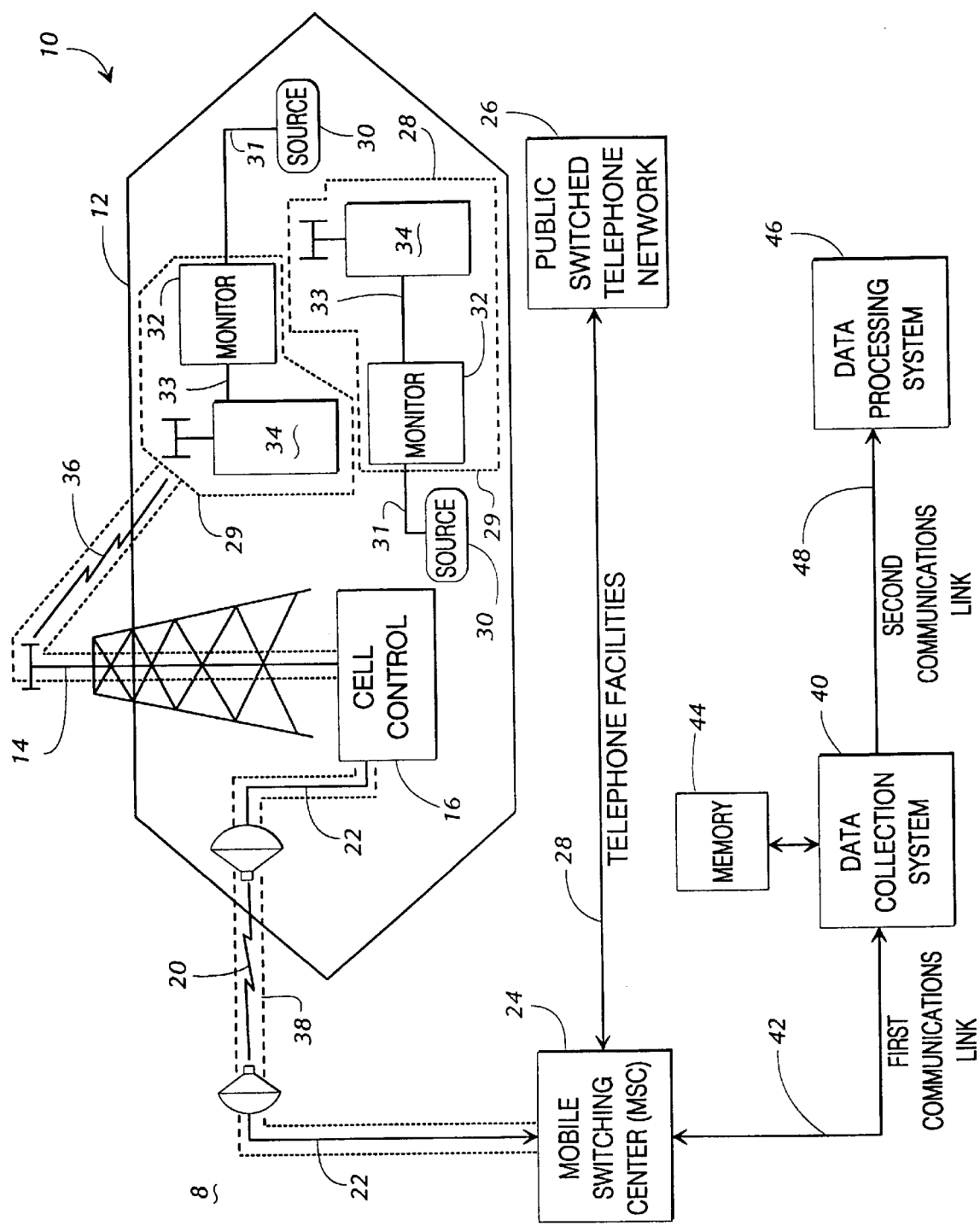
FIG. 1 is a block diagram of a data message system, which provides the preferred operating environment for an embodiment of the present invention.

The present invention is directed to a system for communicating with a cellular communications device by sending multiple paging messages, commonly described as pages, via a cellular network control channel of a cellular mobile radiotelephone (CMR) system and combining data values of the received pages to form a data sequence. Although a conventional cellular device can receive and process discrete pages transmitted over a forward overhead control channel (FOCC) of the cellular network control channel, the present invention provides the advantage of aggregating a sequence of pages to achieve a higher data volume. This adds a new communication function for a device capable of monitoring the cellular network control channel because selected pages can be detected and combined to achieve increased data communication capacity.

The increased data communication capacity offered by the present invention supports the transmission and processing of data and commands or instructions, whereas the prior paging mechanism is limited to sending a command instructing a selected cellular device to register with the CMR system in response to a telephone call. In contrast to the discrete page processing conducted by prior cellular devices, the present invention identifies multiple pages carried by the cellular network control channel to form a proper data sequence containing content for used by the receiving device. The present invention can support the communication of an aggregate message by sending a sequence of pages for reception by a selected cellular communications device or by all cellular communications devices located within the coverage area of the CMR system.

The present invention is preferably implemented for use with a data message system but adapts existing architecture in communications protocols for a conventional CMR system to supply an advantageous approach to the communication of data collected from one or more remote sites. In this data message system, which is described in U.S. Pat. Nos. 5,546,444 and 5,526,401, a cellular communications device can send a data message to a mobile switching center (MSC) via the cellular network control channel. U.S. Pat. Nos. 5,546,444 and 5,526,401 are assigned to the assignee of the present application and are hereby fully incorporated herein by reference.

A cellular communications device of the data message system can receive a page from the MSC via the cellular network control channel. The present invention adds additional communications capability to the data message system by supporting communication of multiple pages via the cellular network control channel to form an aggregate message containing a data sequence for use by the receiving device.

It will be understood that the communication of data messages between the MSC and the cellular communications device is conducted by adapting conventional techniques and known protocols of a CMR system for data communications. Accordingly, prior to describing the detailed operation of the data message system, it will be useful to review the operation of a typical CMR system.

A CMR system is generally characterized by dividing a radio coverage area into smaller coverage areas or "cells" using low power transmitters and coverage-restricted receivers. As will be known to those skilled in the art, the limited coverage area allows the radio channels used in one cell to be reused in another cell. As a mobile radiotelephone within one cell moves across the boundary of the cell and into an adjacent cell, control circuitry associated with the cells detects that the signal strength of the mobile radiotelephone in the just-entered cell is stronger, and communications with the mobile radiotelephone are "handed-off" to the just-entered cell.

A CMR system typically uses a pair of radio frequencies for each radio channel and each cell. Each cell typically includes at least one signaling channel, also referred to as a cellular network control channel or an access channel, and several voice channels. The control channel is selected or dedicated to receive requests for service from mobiles and portables, to page selected mobiles or portables, and to instruct the mobiles or portables to tune to a predetermined voice channel where a conversation may take place. Accordingly, the control channel is normally responsible for receiving and transmitting data to control the communication actions of the mobile and portable radiotelephones.

The control channel normally comprises a FOCC for communications from the MSC to a radiotelephone unit and a reverse overhead control channel (RECC) for communications from a radiotelephone unit to the MSC. The FOCC supplies a multiplexed data stream of message data words, a busy idle signal, and busy idle bits. The busy idle bits are useful for supplying an indication to monitoring radiotelephones about the current status of the RECC. If the RECC is in use by a radiotelephone unit, then the RECC is considered to be busy and the busy idle bit is set to a binary one value. Alternatively, if the RECC is not in use, then the RECC is considered to be idle and the busy idle bit is set to binary zero value. Mobile radiotelephones monitor the busy idle bits transmitted by the FOCC and, if the busy idle bit is set to a binary one value, then the mobile radiotelephone delays transmission on the RECC until the busy idle bit is set to a binary zero value. Thus, a radiotelephone normally transmits on the control channel during the window of opportunity that is presented by a transition from the busy state to the idle state. In particular, the busy idle bit supplies an instantaneous view of the signaling activity on the control channel, and the conventional radiotelephone is responsive to this instant snapshot of control channel activity.

The data message and radio channel specifications for U.S. cellular radiotelephone systems are set forth in Electronic Industries Association/Telecommunications Industry Association (EIA/TIA) Standard 553, implemented in accordance with 47 C.F.R. § 22, in the Report and Orders pertaining to Federal Communications Commission (FCC) Docket No. 79-318. Copies of the EIA/TIA-553 may be obtained from the Engineering Department of the Electronic Industries Association at 2001 Pennsylvania Avenue, N.W., Washington, D.C., U.S.A. 20006.

It is known that when a cellular mobile radiotelephone originates a call, it transmits a series of data messages to the serving cell. These messages, commonly referred to as Call Origination, are defined by EIA/TIA-553. These data messages contain the low order seven digits of the unit's telephone number, known as the Mobile Identification Number (MIN), the unit's Station Class Mark (SCM), which identifies functional characteristics of the unit, and the Called Address, or dialed telephone number. Cellular system operators typically also require additional data words to be transmitted that contain the MIN2, which is the high order three digits or NPA of the cellular unit's telephone number, and the Electronic Serial Number (ESN). The MIN is assigned to a particular radiotelephone unit by the cellular service provider selected by the subscriber. The MIN typically contains information unique to the CMR system operator, for example, the first three digits of the MIN ("XXX") typically correspond to an area code, the next three digits ("XXX") typically correspond to a geographic location within the area code; and the final four digits ("XXXX") identify a particular piece of equipment. Similarly, the ESN is unique to each mobile cellular radiotelephone unit, and comprises a format that allows differentiation as to manufacturer and, in some cases, the model number, date of manufacture, and the like.

These messages are provided first to the cell, and then through a data link to a mobile telephone switching center, otherwise described as a mobile switching center. The MSC, also known as a "switch," makes voice connections between mobile radiotelephones and other telecommunications networks. At the MSC, a determination is typically made whether the radiotelephone is an authorized user or subscriber by looking up the unit's telephone number, serial number, and other information supplied by the radiotelephone to see if there is an entry in the MSC's database corresponding to that particular telephone. An optional function of an MSC is to validate that the ESN and MIN received as part of a Call Origination message are valid. If the MIN is valid and the radiotelephone is identified as a subscriber within the given cellular system, i.e., a "home" unit, the received ESN is compared to the MSC's database ESN entry to detect fraud. If these checks succeed, the cellular call is then allowed to proceed.

It is also well known that when a mobile radiotelephone first powers up or first enters a CMR system when already powered, the unit can identify itself as actively present within the system. The radiotelephone identifies itself or "registers" through a process known as Autonomous Registration by supplying a data packet similar to that of a Call Origination message. The Autonomous Registration signal, also referred to as a registration or identification signal, typically comprises data fields for at least a mobile telephone number, i.e., the MIN, and an ESN. The original design attempt of Autonomous Registration was to improve the efficiency of potential future call deliveries by keeping the MSC informed of the approximate whereabouts of each individual radiotelephone unit, and to reduce paging channel load by lessening the need to page all cells to find a particular cellular unit. When the MSC is thus informed, it can later "page" or attempt to ring the cellular unit only in the cell or area that it was last known to be in. Additional cells would be paged only if the initial page did not locate the particular radiotelephone. Thus, Autonomous Registration is simply a set of messages periodically and autonomously sent from the mobile radiotelephone to the serving cell at an interval specified in data parameters previously received from the cell by the cellular unit.

Referring now to the drawings, in which like numerals indicate like elements throughout the various figures, FIG. 1 illustrates a data message system 10 operating within a CMR system 8. Referring to FIG. 1, the data message system 10 supports the collection and communication of data to a central data collection site by reporting systems associated with numerous data sources. By operating within the environment of the CMR system 8, which is well adapted for portable or mobile communications, the data message system 10 takes advantage of an existing wide area communications network and avoids the expense of communicating with each remote data site via a dedicated conventional telephone facility or conventional two-way radios. Numerous communications applications are available for the data message system 10, including communicating data collected from a wide variety of data sources, such as utility meters, community antenna television (CATV) pay-per-view (PPV) terminals, equipment operating at isolated sites, and security alarm systems.

The data message system 10 adapts the existing environment of a CMR system to communicate data from one or more remote sites to a central location. However, to conserve the use of voice channels of the CMR system for conventional telephone conversations, the data message system 10 uses the cellular network control channel of the CMR system for data communications. This permits conservation of the valuable frequency spectrum dedicated to the voice channels of the typical CMR system.

A typical CMR system includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. A mobile telephone switching office, such as the MSC 24, can communicate with the cell 12 either by dedicated telephone facilities (not shown) or, more frequently, by a cell-to-mobile switching center data link 22 between the cell control 16 and the MSC 24. At least a portion of the data link 22 is typically supported by a wireless communications link, such as the microwave link 20, located between the cell 12 and the MSC 24.

It is well known to those skilled in the art that the conventional CMR system comprises at least one mobile telephone switch coupled to an appropriate array of more or less identically equipped cell sites 12. The MSC 24 normally couples telephone conversations involving mobile radiotelephones operating in the cell 12 to the public switched telephone network (PSTN) 26 through telephone facilities 28.

The data message system 10 includes a set of data reporting devices 29, each comprising at least one monitor 32 for collecting data from remote data sources 30 and a cellular communications device 34 for communicating the collected data via a control channel of the CMR system to the MSC 24. The monitor 32, which is connected to a corresponding remote data source 30 via a signal path 31, obtains and records selected data directed to the operation or performance characteristics of the data source 30. In turn, the cellular communications device 34, which is connected to the corresponding monitor 32 via a signal path 33, prepares a data packet containing the selected data and transmits the packet as a data message. The selected data represents actual data acquired by the monitor 32 in response to monitoring the operation or performance of the data source 30. Alternatively, the selected data can represent predetermined data or a preprogrammed message that is associated with the detection of a certain event by the monitor 32 for the data source 30.

The MSC 24 receives the data message via a cellular network control channel 38 formed by the combination of the data link 22 and a cellular communications link 36 between the broadcast antenna 14 and the cellular communications device 34. This combination of communications links is collectively referred to as the control channel. It is well known that a cellular network control channel for a conventional CMR system comprises two radio channels that are commonly described as a FOCC 38a and a RECC 38b. The FOCC 38a is used for communications initiated by the MSC to a radiotelephone unit. In contrast, the RECC 38b is used for communications from the radiotelephone to the MSC 24. The communications operations of the data message system also use this convention for communications between the MSC 24 and the cellular communications device 34. In particular, the control channel 38 comprises two separate data communications paths, an FOCC 38a for communications initiated by the MSC 24 and an RECC 38b for communications initiated by the cellular communications devices 34 (or mobile radiotelephones operating within the cell). Accordingly, the cellular communications device 34 transmits data messages via the RECC 38b, whereas the MSC 24 transmits command signals via the FOCC 38a.

In this manner, the MSC 24 can receive data messages from each of the cellular communications devices 34 operating within the coverage areas of an array of cells for the CMR system 8. Although the data messages contain selected data rather than the parameters normally contained in an actual radiotelephone control information, the MSC 24 will operate upon the data messages as if they were transmitted by a conventional radiotelephone operating within the cell because the data messages are formatted to appear as a registration signal or a call origination signal generated by a radiotelephone unit.

The MSC 24, in response to a data message, can conduct one or more of the following operations: store the data message for processing at a later date, process the selected data supplied by the data message, or forward the data message to a data collection system 40 via a first communications link 42. The data collection system 40, which is connected to a memory storage device 44, collects the selected data by storing the received data messages within the memory storage device 44. Similar to the MSC 24, the data collection system 40 also can process the selected data to obtain further information concerning the operation or performance of the data sources 30. Alternatively, the data collection system 40 sends the data message to a data processing system 46 via a second communications link 48. The data processing system 46 is typically remotely located from the data collection system 40 and facilitates convenient processing of the selected data at a central site. The second communications link 48 is typically implemented by a conventional telephone facility, a dedicated data link, or by a wireless communications link.

An example of a typical application for the data message system 10 is to monitor the loads of an electrical load system and to communicate energy consumption data to a central site for processing. The utility industry typically determines the effectiveness of an electrical load management system for a selected control scenario by collecting or monitoring energy consumption data for certain customers during load management activities. In particular, the utility compares the maximum energy consumed by the selected customers for certain collection periods to the maximum energy that would be consumed by those customers in the absence of any load management activities. A utility typically uses a load profile recorder located proximate to each customer's electrical load for recording the customer's power consumption during predetermined time intervals. Upon the conclusion of the collection period, the recorded energy consumption data is then forwarded from each load profile recorder to a central data processing site for data translation and evaluation. It is well known to use a conventional telephone system to send energy consumption data recorded by the load profile recorder to the data processing site.

For this application, the monitor 32 operates as a load profile recorder to obtain the energy consumption data from the data source 30, in this case an electrical load. The cellular communications device 34 thereafter transmits a data message containing the energy consumption data to the MSC 24. The MSC 24 can then forward the data message to the data collection system 40 for processing of the energy consumption data or, in turn, the data collection system 40 sends the data message to the data processing system 46 for processing operations. In this manner, the utility can collect energy consumption data from numerous electrical loads to support the utility's evaluation of the effectiveness and cost benefit of its electrical load management program.

It will be recognized that the data message system 10 is useful for a wide variety of data collection and reporting activities and that the above-described examples are not intended to limit the scope of applications for the present invention.

Figure 2:
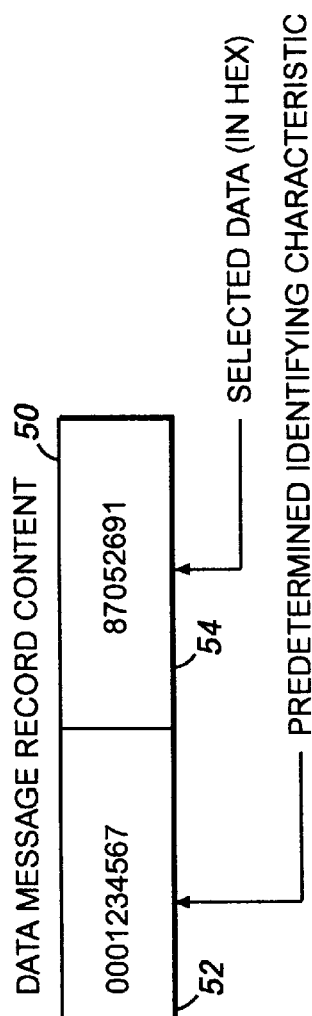
FIG. 2 is a diagram that shows the format for a data message that is exchanged between a cellular communications device and a mobile switching center (MSC) of the data message system illustrated in FIG. 1.

Referring still to FIG. 1, in response to the transmission of a data message by a cellular communications device 34, the MSC 24 typically makes a determination whether the cellular communications device 34 that transmitted the data message is an authorized user or subscriber of the services offered by the cellular system 8 or another system. As shown in FIG. 2 and described below with respect to the data message format, the data message preferably includes certain information that identifies the cellular communications device 34 as a radiotelephone that normally operates within a certain remote or foreign cellular system. Based upon this information, the MSC 24 decides that the cellular communications device 34 is a "roamer" because it appears to be affiliated with the cellular service offered by another cellular system, which, in this case, is the remote cellular system. In particular, the MSC 24 maintains a list or database that identifies the certain information in the data message as belonging to a particular cellular system and, by checking this database, determines whether the cellular communications device 34 is a subscriber or a roamer. Thus, it will be understood that the MSC 24 interprets the data message as a transmission from a roaming mobile radiotelephone operating within the CMR system 8.

The remote cellular system identified by the data message is not an actual operating cellular system for supporting telephone conversations, but rather is dedicated to data collection applications and is represented by the data collection system 40. In recognition that the cellular communications device 34 is actually associated with the remote cellular system, the MSC 24 forwards the data message to the data collection system 40 via the first communications link 42. The data collection system 40 responds by sending to the MSC 24 a message which confirms that the roamer associated with the data message is a valid or authorized user of the remote cellular system. The cellular communications device 34 is thereafter added as a registered radiotelephone to a database of registered roamers at the MSC 24.

The data collection system 40 has now received the data message containing selected data collected from the remote data source 30 and, unlike the MSC 24, recognizes that the data message actually contains the desired data collected from a remote data source 30. Accordingly, the data collection system 40 transmits a message to the MSC 24 that instructs the MSC to delete the cellular communications device 34 from its list of registered roamers. It will be understood that the MSC 24 would normally receive this type of message when a roaming radiotelephone has moved to another cellular system and subsequently registered for operation on that other system. Thus, the database of the MSC 24 is no longer required to maintain the registration information concerning the cellular communications device 34 after transferring the data message to the data collection system 40.

Alternatively, the MSC 24 clears its database of such registration information upon the expiration of a certain time interval. The data collections system 40 can respond to the data message by transmitting a message which confirms that the roamer is a valid user and further instructs the MSC 24 to delete the registration entry upon the expiration of the certain time interval. As a separate option, the MSC 24 can automatically delete a registration entry from the MSC database upon expiration of a certain time period without any instruction from the data collection system 40. In this manner, the data collection system 40 is not required to send yet another message to the MSC 24 after the data collection system 40 confirms that the cellular communications device 34 represents a valid user.

The MSC 24 and the data collection system 40 are preferably compatible with the EIA/TIA Interim Standard 41 (IS-41 standard). The IS-41 standard defines a communications protocol for communications between two cellular systems. The IS-41 standard allows cellular calls to be handed-off between dissimilar cellular systems, not unlike the way that calls are handed-off between cells of a single CMR system. In addition, the IS-41 standard permits call deliveries and a communications exchange for verifying whether a cellular caller is a valid cellular service subscriber. In this manner, the MSC 24 hands-off or forwards the data message to the data collection system 40 via the first communications link 42, which is preferably implemented as an IS-41-compatible network. In response, the data collection system sends a user validation message via the link 42 to confirm that the source of the data message, specifically a cellular communications device 34, is a valid cellular source.

In particular, the data collection system 40 recognizes that the received data message contains selected data which has been transmitted by a cellular communications device 34. Accordingly, the data collection system 40 processes the received data message and compares the predetermined identifying characteristic in its data message to a list of such characteristics in its database. This database preferably contains an entry of the predetermined identifying characteristic for each of the known cellular communications devices 34 and corresponding data that identifies the associated device as a valid cellular source. Upon obtaining a positive match, the data collection system 40 preferably responds to the received data message by sending to the MSC 24 the verification message. It will be appreciated that the data collection system 40 also can forward to the MSC 24 a message confirming the absence of a valid entry for the cellular communications device 34 in response to a negative match.

This validation message can also include a profile of communications services that are authorized for use by the particular cellular source. For example, this user profile typically defines the operations limitations for the cellular source, including access to long distance services, the capability for the source to only originate (and not receive) calls via the cellular system, etc. The user profile information can contain an instruction that commands the MSC 24 to delete from its database the registration entry for the particular cellular communications device after the expiration of a certain time period. This allows the MSC 24 to clear from its database entries for cellular communications devices 34 that have communicated their data message via the cellular system 8 by registering with the MSC 24 because such devices no longer require the continued communications support of the MSC 24.

The data collection system 40 can store the selected data supplied by the received data message within the memory storage device 44, can process the selected data and store the resultant data, or can forward the selected data to the data processing system 46 for processing. Prior to sending the selected data to the data processing system 46, the data collection system 40 first converts the data message to an acceptable communications protocol for conveying the data message to the data processing system 46. This step is necessary prior to communication with the data processing system 46 because, unlike the MSC 24 and the data collection system 40, neither the data processing system 46 nor the second communications link 48 are compatible with the IS-41 standard.

Although the MSC 24 is typically programmed to treat the cellular communications devices 34 as roamers associated with a foreign cellular system, it will be appreciated that the database of the MSC 24 also can be programmed to contain entries for the predetermined identifying characteristics of those cellular communications devices 34 operating within the cells of the cellular system 8. Upon receiving a data message via the control channel 38 from such a device 34, an MSC 24 containing such database entries will identify the transmitting cellular communications device 34 as a "home" unit rather than as a roamer because the MSC database contains an entry that corresponds to the predetermined identifying characteristic supplied by the message. Thus, the MSC 24 registers the transmitting cellular communications device 34 as a home unit of the cellular system 8. This avoids the additional requirement of contacting a foreign cellular system, such as the data collection system 40, to inquire whether this cellular source is a valid user or subscriber of cellular services.

However, to initiate the necessary transfer of the information in the data message to the data collection system 40, the MSC 24 for this embodiment is adapted to recognize that data messages should still be forwarded to the data collection system 40. Specifically, based upon a portion of the predetermined identifying characteristic that is uniquely associated with the data collection system 40, the MSC 24 locates an entry in its database that commands the switch to send all messages containing such a characteristic to the data collection system 40. Accordingly, the MSC 24 thereafter forwards the data message via the first communications link 42 to the data collection system 40.

The data collection system 40 can be implemented by a computer. One embodiment for the data collection system 40 is the computer of a service circuit node. Certain manufacturers of switches, such as the MSC 24, also offer devices for implementing communications with the data collection system 40, including the Motorola EMX switch and other vendor proprietary switches. Switch manufacturers include: AT&T Network Systems, Whippany, N.J.; Ericsson Radio Systems, Richardson, Tex.; Hughes Network Systems, Germantown, Md.; and Motorola, Schaumburg, Ill.

The cellular system 8 is preferably implemented as an AMPS or a DAMPS cellular system. However, it will be appreciated that the cellular system 8 also can be compatible with alternative cellular systems implementing a control channel for mobile-to-cell communications.

It will be appreciated that the CMR system 8 includes an array of cells, such as the cell 12, and that a set of reporting systems 29, each formed by the monitor 32 and the cellular communications device 34, are typically located in a cell. For each data source 30 within the cell 12, the monitor 32 and the cellular communications device 34 are preferably located proximate to the data source 30 to minimize the lengths of the signal paths 31 and 33. To facilitate economical installation of the reporting device, the monitor 32 and the cellular communications device 34 can be combined within the same housing and this housing can be installed either adjacent to or as an integral part of the data source 30. For an installation proximate to the data source 30, the signal path 31 and the signal path 33 preferably form hard-wired connections between the connected devices. Nevertheless, it will be appreciated that the signal paths 31 and 33 also can be implemented as either infrared communications links or wireless communications links.

It will be understood that a single cellular communications device 34 can be connected to multiple monitors 32 to permit the transmission of selected data collected from associated data sources 30 located at a central site. For example, a single cellular communications device 34 can be mounted at a central location within or along an office building and multiple monitors 32 can be distributed throughout the building to permit the acquisition of data from the associated data sources 30.

The data collection system 40 can be located proximate to or as an integral part of the MSC 24, in which case the first communication link 42 preferably forms a hard-wired connection between the devices. However, the data collection system 40 also can be positioned at a remote site. For this remote installation, the first communications link 42 can be implemented as a wireless communications system, such as a microwave system, or as a dedicated data line, such as a conventional telephone facility. For the convenience of the party that is sponsoring the collection of a particular type of data, the data processing system 46 is typically located at another remote site that is typically proximate to the sponsoring party.

FIG. 2 is a diagram that shows the format for the data message that is communicated by the data message system 10. Referring now to FIGS. 1 and 2, a data record 50 for the data message contains both a data field 54 for the selected data acquired from the remote data source 30 and a data field 52 for a predetermined identifying characteristic which uniquely identifies the cellular communications device 34 that initiates the transmission of the data message. To take advantage of the existing architecture of a CMR system 8, the format for the data message preferably is identical to the message format (or data record) for an identification signal that is transmitted by a cellular radiotelephone when it first identifies itself to a CMR system, such as the CMR system 8.

By using the data message format associated with a registration signal, the cellular communications device 34 "registers" with the MSC 24 by sending a data message that appears to contain a mobile telephone number and an ESN. Although it is not intended for the cellular communications device 34 to place a conventional voiced-based cellular telephone call, the cellular communications device 34 nevertheless registers for operation with the MSC 24, thereby enabling the communication of the selected data from the field.

Alternatively, the format for the data message can be identical to the format or data record for a call origination signal that is transmitted by a cellular radiotelephone when it originates a telephone call. Similar to the format for a registration signal, the cellular communications device 34 can appear to originate a call by sending a data message formatted as a call origination signal to the MSC 24. Although the MSC 24 processes the data message as if it contained a mobile telephone number and an ESN, the data message is actually used to communicate selected data placed within one or more data fills normally reserved for the mobile telephone number and the ESN. Although the call origination signal format can be used to transport data from the cellular communications device to the MSC, it will be understood that the data message system 10 is employing this format for data communication rather than for call origination.

As shown in the data record 50 in FIG. 2, the standard message format for a registration signal (call origination) has been adapted by the data message to permit the identification of the particular transmitting cellular communications device 34 and the communication of the selected data. In particular; the data field 52 for the predetermined identifying characteristic corresponds to at least a portion of a mobile telephone number or MIN assigned to the cellular communications device 34. Thus, the predetermined identifying characteristic is substituted within the data field normally reserved for the MIN in an identification signal. This predetermined identifying characteristic can belong to a set of unassigned mobile telephone numbers. Alternatively, the predetermined identifying characteristic assigned to each cellular communications device 34 can be a conventional telephone number or a set of 10 digits. The predetermined identifying characteristic permits the identification of the source of the data by uniquely identifying the cellular communications device 34 associated with the remote data source 30. The predetermined identifying characteristic also supplies information used by the MSC 24 to recognize that the data message containing this predetermined identifying characteristic is associated with the data collection system 40.

Furthermore, the data field 54 in the data message for remote data corresponds to the location within the data record for the ESN. Those skilled in the art will appreciate that the ESN is 32 bits long and includes 8 bits for a manufacturer code. For cellular systems that do not review or screen ESNs based upon the manufacturer code segment, it is possible to manipulate the data field normally filled by an ESN to supply a data message having a data field 54 containing 32 bits of selected data. However, if the cellular system uses the manufacturer code segment of the ESN, the selected data within the data field 54 comprises a length defined by the remaining 24 bits of the ESN. For most applications, it will not be necessary to manipulate the manufacturer's code segment of the ESN because a data message having 24 bits of selected data (and, as required, 8 bits of the manufacturer code segment for a conventional ESN) should be sufficient to supply relevant data.

Figure 3:
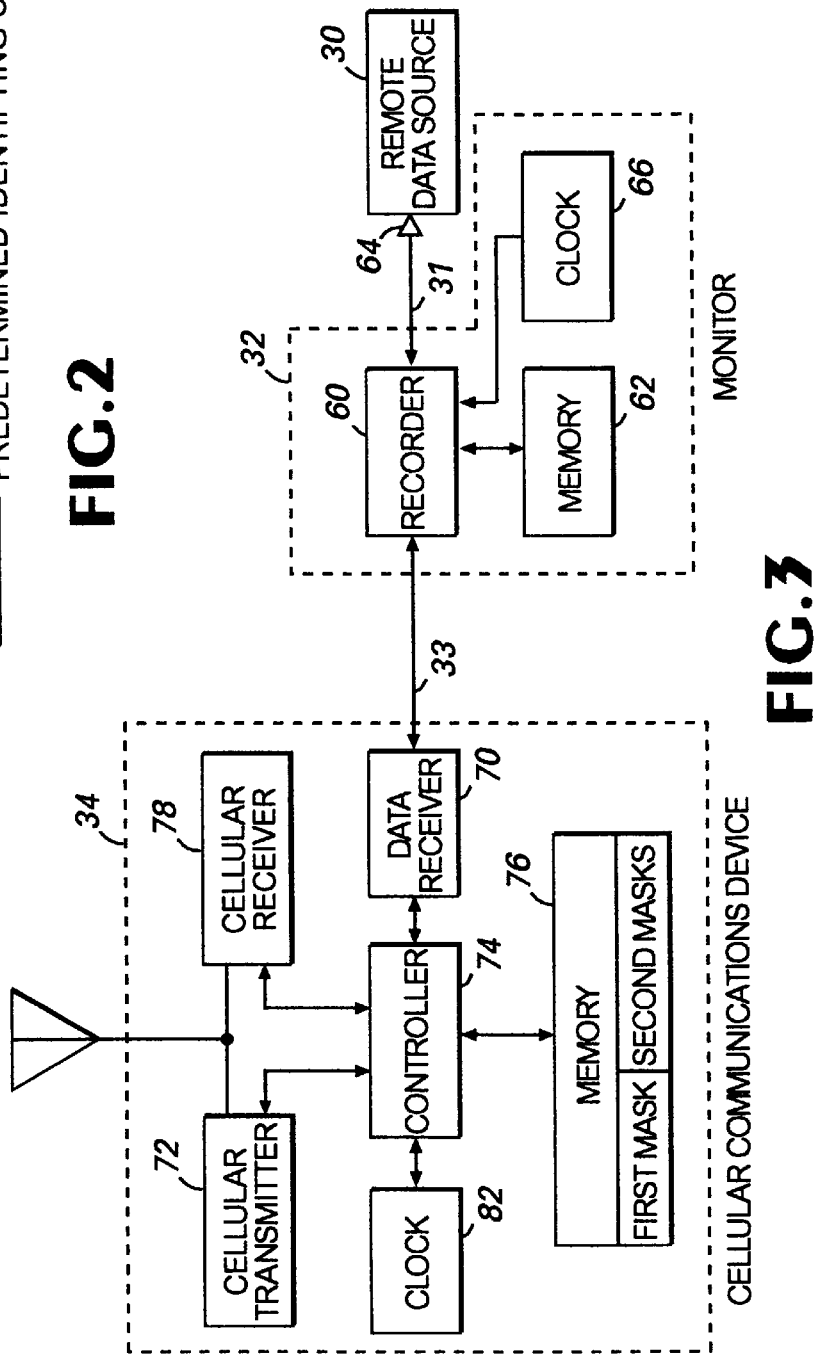
FIG. 3 is a block diagram of a data reporting system for the data message system illustrated in FIG. 1.

FIG. 3 is a block diagram that illustrates the components of the reporting system 29, namely the monitor 32 and the cellular communications device 34. Referring now to FIGS. 1 and 3, the monitor 32 includes a recorder 60, a memory 62, and one or more sensors 64. The recorder 60, which is connected to the data source 30 via the signal path 31, uses the sensors 64 to detect certain operating or performance characteristics of the data source 30. The detected characteristics represent selected data that are preferably stored within the memory storage device 62. The memory 62 is preferably random access memory (RAM). However, it will be understood that the memory 62 also can be implemented by other types of data storage devices, including flash memory, a flexible diskette, a computer hard disk or an optical disk.

It will be appreciated that the signal path 31 represents one or more signal channels for transferring the selected data to the recorder 60 and, furthermore, that the recorder 60 can be implemented as either a single or multi-channel recording device. Each signal channel normally would be associated with a different operating or performance characteristic for the data source 30.

For certain applications, the recorder 60 records selected data from the data source 30 for a predetermined time period. A clock 66 connected to the recorder 60 supplies timing data to the recorder 60, thereby enabling the recorder 60 to add a time tag to the selected data. The time tag indicates the relative time for the start of each predetermined time period of recording operations. Assuming that the predetermined time period is a known value, the addition of the time tag data permits the calculation of the start and completion times for each data reporting operation. Correlation of the data collection time to the selected data is desirable for certain processing operations. The clock 66 can be implemented as a conventional counter supplied by a hardware device or as a software routine executed by a microprocessor.

The cellular communications device 34 includes at least a data receiver 70, a cellular transmitter 72, and a controller 74. The data receiver 70, which is connected to the recorder 60 via the signal path 33, receives the selected data obtained from the data source 30 by the monitor 32. The controller 74, which is connected to the data receiver 70 and the cellular transmitter 72, controls the respective operations of the data receiver 70 and the cellular transmitter 72. The controller 74 is preferably a microprocessor-based control system that can be programmed to conduct control operations in a manner known to the art.

In response to the selected data, the controller 74 prepares a data packet containing the predetermined identifying characteristic associated with the cellular transmitter 72 and the selected data collected from the data source 30. The cellular transmitter 72 responds to the data packet by transmitting a corresponding data message via the control channel 38 of the CMR system 8. Specifically, the cellular transmitter 72 uses the RECC of the control channel 38 to send data messages to the MSC 24. Although the cellular transmitter 72 can be implemented as a conventional transmitter for a radiotelephone unit, the preferred cellular transmitter 72 uses only the data radio channels of the CMR system 8 for transmission of data messages.

The cellular communications device 34 further includes a memory storage device 76 connected via a bi-directional data path to the controller 74. The selected data received by the data receiver 70 can be stored in the memory storage device 76 prior to the transmission of a data message by the cellular transmitter 72. Although the memory storage device 76 is shown as a separate memory from the memory storage device 62, it will be appreciated that the memory storage devices 62 and 76 can be implemented as a single memory which is accessible by both the recorder 60 and the controller 74.

To connect the cellular communications device to another device, such as a monitor 32, a signal path is connected between both devices, as illustrated by signal path 33 in FIG. 3. The signal path 33 can be implemented as a conventional data communication link compatible with known protocols, including the RS-232 serial protocol. To support an exchange of data between both devices, the signal path 33 is preferably a bi-directional signal path. In addition to the external port connected to the signal path 33, the cellular communications device 34 can include other external data ports. These additional data ports can be connected directly to the controller 74, a data receiver and/or transmitter, or a memory storage device. For example, an external port can be used to program the cellular communications device 34 prior to field operations. Alternatively, an external port can be used to output data from the cellular communications device 34 to another device. It will be understood that the cellular communications device 34 is not limited to the single external port shown in FIG. 3, and can include additional external ports as required to support various applications.

To receive communications from the MSC 24 via the FOCC of the cellular network control channel 38, the cellular communications device 34 also includes a cellular receiver 78. The cellular receiver 78, which is connected to the controller 74, can be implemented as the cellular receiver for a conventional radiotelephone. However, similar to the cellular transmitter 72, the preferred cellular receiver 78 operates to receive information primarily via the data radio channels rather than the voice radio channels of the CMR system.

It is well known that the FOCC of the cellular network control channel carries a stream of busy idle bits to indicate the status of the RECC of the cellular network control channel. The RECC is busy if the busy idle bit is set to a binary one value. To minimize the impact of transmissions by one or more cellular communications devices 34 within the cell 12 upon the normal control signal traffic on the control channel 38, the cellular transmitter 72 preferably transmits the data message during those periods when the channel is available or is likely to be available. Accordingly, the cellular receiver 78 monitors the FOCC of the control channel 38 to enable a determination of the amount of activity on the RECC for the monitored cell. By monitoring the FOCC and counting the number of busy idle bits set to the binary one value for a predetermined time period, the cellular communications device 34 can determine the level of control channel activity during that time period. If the level of control channel activity falls below a certain threshold associated with light or no activity on the control channel, then the controller 74 supplies the data packet to the cellular transmitter 72. In response, the cellular transmitter 72 initiates a data message transmission to the MSC 24 via the RECC of the control channel 38.

In particular, the cellular communications device 34 preferably monitors the busy idle bits carried by the FOCC of the control channel 38 for sequential, predetermined time periods. The cellular communications device 34 calculates and stores (1) a running average of the "highest" count of busy idle bits set to the binary one value per each monitoring time period, and (2) a last "n" count of busy idle bits set to the binary one value per monitoring time period. To calculate the running average, a newly acquired count of busy idle bits set to the binary one value per time period is averaged with a stored average of busy idle bits set to the binary one value if the count for the immediately preceding interval is higher than a value of one standard deviation lower than the stored average. Prior to transmitting a data message via the control channel 38, the cellular communications device 34 will average the stored last "n" counts of busy idle bits set to the binary one value per time period and compare that computed "n" average to the stored running average. If the computed "n" average drops below the stored running average, then the cellular communications device 34 outputs the data message. However, if the computed "n" average exceeds the stored running average, then the cellular communications device 34 will delay the transmission. In contrast to conventional radiotelephone units, which are responsive to an instantaneous view of activity on the control channel, it will be appreciated that the above-described transmission queuing process is a heuristic method based upon a deterministic analysis of the stream of busy idle bits.

In this manner, the cellular transmitter 78 transmits the data message only when the control channel is available for clear use by the cellular communications device 34. This form of data queuing minimizes the possibility that the operation of numerous cellular communications devices 34 within the cell 12 will interfere with normal telephone conversations involving the operating radiotelephones within the cell. Nevertheless, it will be appreciated that the cellular transmitter 78 also can transmit the data message without first checking the availability of the control channel 38.

Alternatively, the cellular communications device 34 can be programmed to transmit the data message during a certain time interval, such as during the early morning hours between midnight and 6 AM, when control signal traffic is normally at a minimal level. To permit this type of automated transmission operation, the cellular communications device 34 includes a clock 82 connected to the controller 74. The clock 82 outputs a clock signal in response to expiration of a time interval. In response to the clock signal, the controller 74 initiates a data message transmission by the cellular transmitter 72. In this manner, selected data is transmitted during a known time interval from one of the reporting devices within the cell 12 to a central location.

The clock 82 preferably outputs the clock signal during the time period when use of the control channel 38 is at a reduced level, thereby minimizing the possibility that the cellular communications device 34 will interfere with the normal communications operations of the CMR system 8. In particular, the time interval is preferably selected with advance knowledge of the reduced activity periods for conventional telephone conversation traffic on the CMR system 8 to ensure that data message transmissions by the various cellular communications devices 34 in the cell 12 are conducted on a noninterference basis with voice call processing messages transmitted to and from the radiotelephones operating in the cell. The clock 82 can be implemented as either a hardware counter or as a software counter implemented by coded instructions executed by the controller 74.

A data transmission by the cellular communications device 34 also can be initiated in response to a status signal output via the signal path 33 by the monitor 32. This status signal causes the cellular communications device 34 to transmit the stored selected data via the RECC of the control channel 38. The monitor 32 typically outputs the status signal in response to the completion of a data recording event. For example, in a typical vending equipment application, the monitor 32 can output the status signal in response to an alarm event, such as the detection of a maintenance service requirement. Alternatively, for an utility load management application, the monitor 32 can output the status signal in response to detection of possible tampering of the utility's load control device. Those skilled in the art will appreciate that the generation of the status signal is event-driven and that the applications for the data message system 10 will determine those events.

It will be appreciated that the process of outputting a clock signal or a status signal to initiate a data message transmission by the cellular communications device 34 is similar to an Autonomous Registration operation that is conducted by certain known radiotelephone units. For an Autonomous Registration, the radiotelephone automatically identifies itself to the cellular system by initiating its own registration operation. Likewise, for the described embodiments, the cellular communications device 34 responds to the clock signal or the status signal by sending a data message having a message format that is representative of the data record for a registration signal (call origination signal) of a radiotelephone unit. In turn, the MSC 24 receives the data message via the control channel 38 and subsequently operates upon the data message as if it were a registration signal (call origination signal) transmitted by a conventional radiotelephone unit.

It is well recognized that a cellular network control channel, such as the control channel 38, is a two-way communications path between the MSC 24 and the radiotelephone devices operating in the cell 12. Specifically, an MSC 24 can send a paging message or "page" to one or more radiotelephone devices operating within the coverage area defined by the cell 12 of the CMR system 8. In contrast to conventional radiopaging systems, this page message is transmitted via the FOCC of the CMR system rather than via a radiopaging terminal. For CMR systems, this page message is typically used to notify a cellular mobile radiotelephone device that an incoming telephone call is pending, thereby prompting the cellular device to register with the CMR system.

The receiver 78 can receive pages from the MSC 24 via the FOCC of the control channel 38. For example, the MSC 24 can output command signals, which are formatted as pages, via the control channel 38 to initiate certain operations or to control certain functions of one or more of the cellular communications devices 34 within the cell 12. The cellular communications device 34 can respond to a command signal by conducting a particular operation or by controlling a certain function associated with the command signal.

The command signals typically include address data and each cellular communications device 34 responds to a command signal containing its predetermined address data. This allows the MSC 24 to communicate with one or more of certain cellular communications devices 34. By proper use of the addressing operation, it is possible for the MSC 24 to remotely control the operations or functions of a subset of the cellular communications devices 34 that is selected from the overall group of devices 34 within the cell 12.

The command signal is preferably a 10 digit number that represents a conventional mobile telephone number. At least a portion of this telephone number can be assigned as an identifier for a corresponding cellular communications device 34. The remaining portion (if any) of the 10-digit telephone number can represent a command or data for a particular operation or function. In this manner, a cellular communications device 34 can be programmed to respond only to a command signal containing its address data and to conduct the particular operation or function identified by the command.

By transmitting command signals to the cellular communications devices 34, the MSC 24 can remotely control various operations of the cellular communications devices 34 or can remotely define various programmable operating parameters of the devices 34. For example, in response to a selected command signal, the cellular communications device 34 "registers" with the MSC 24 by transmitting a data message to the MSC 24. It will be appreciated that this command signal is similar to a conventional Locate Request signal generated by a CMR system, such as the AT&T Autoplex System, and requests registration of a selected radiotelephone unit. By use of this command signal, a selected cellular communications device 34 can be polled at any time by the MSC 24 to initiate the transmission of a data message containing the desired selected data.

For another representative example, the time interval for the clock 82 can be modified or otherwise replaced with a substitute time period in response to a command signal. The cellular communications device 34 also can instruct the monitor 32 to initiate a recording of data from the remote data source 30 in response to yet another command signal. In particular, the controller 74 responds to the detection of the command signal by the cellular receiver 78 and outputs an instruction signal to the recorder 60 to prompt the data reporting operation.

The opportunity for placing a command or data, or a combination of a command and data, within the conventional format of a paging message is limited by the defined character length of the paging message, typically the 10-digit telephone number or MIN. For relatively short data lengths, the transmission of a single independent page message from an MSC to a cellular device in the manner known to the art is useful to support limited communications. This fixed data length for a page message is satisfactory for the paging communication task of conventional CMR system operations, namely, the polling of one or more mobile radiotelephones within the coverage area of the CMR system. This polling technique only requires the transmission of a single discrete page message to prompt a response from a mobile radiotelephone unit that receives the page. Prior to the present invention, there was no readily available mechanism for exploiting the paging message mechanism to transfer an expanded data set.

To increase data capacity, the present invention provides a system for communicating multiple page messages or pages via the cellular network control channel to a cellular-compatible receiving device and combining the data obtained from each received page to form an aggregate message comprising a data sequence. Although the present invention will be described herein with respect to the preferred operating environment of the data message system 10 shown in FIG. 1, those skilled in the art will appreciate that the present invention can be extended to other operating environments.

Figure 4A:
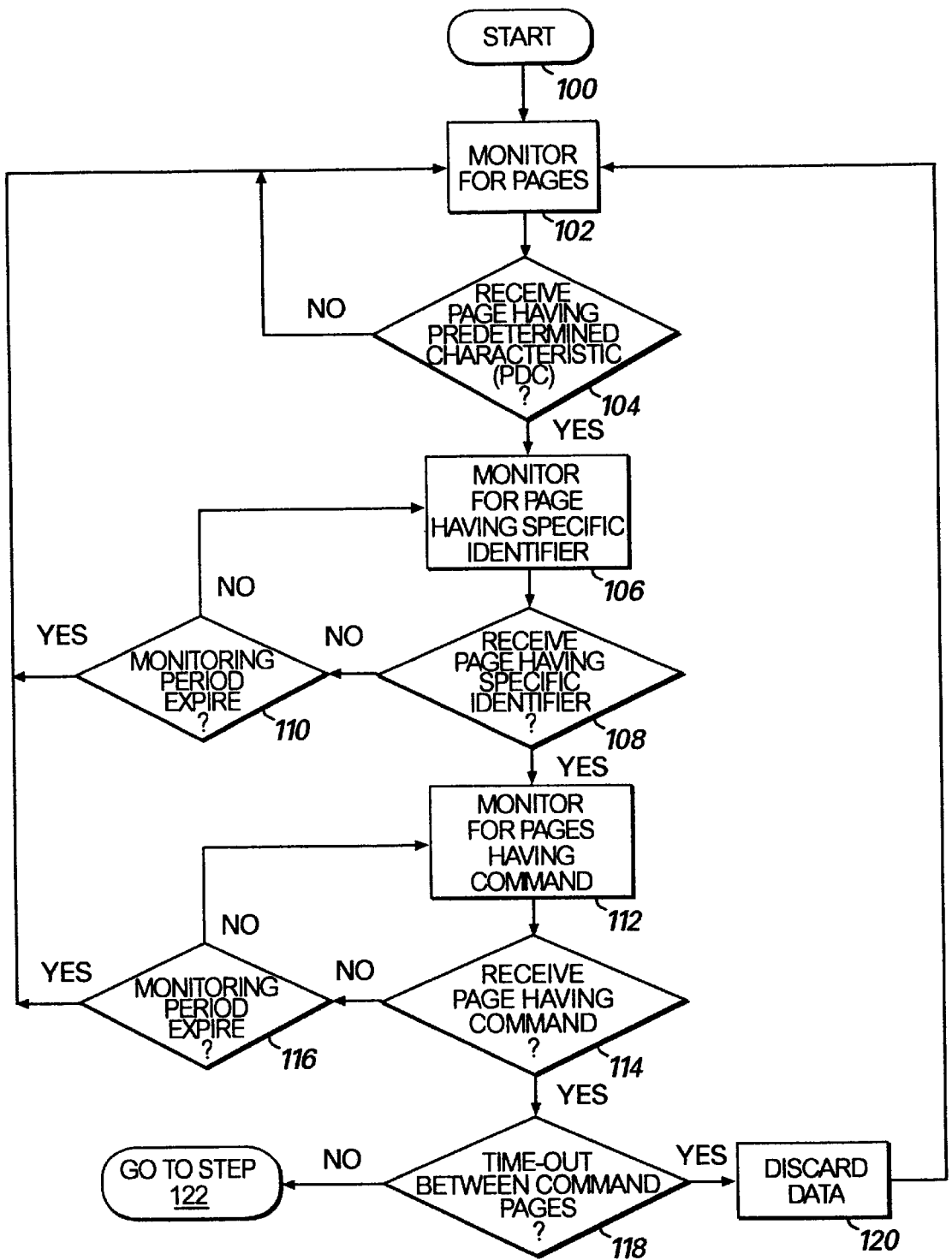
FIG. 4A and FIG. 4B, collectively described as FIG. 4, are logical flow diagrams illustrating the steps for communicating an aggregate message by sending a set of paging messages and combining the data values of the received paging messages in accordance with an embodiment of the present invention.
Figure 4B:
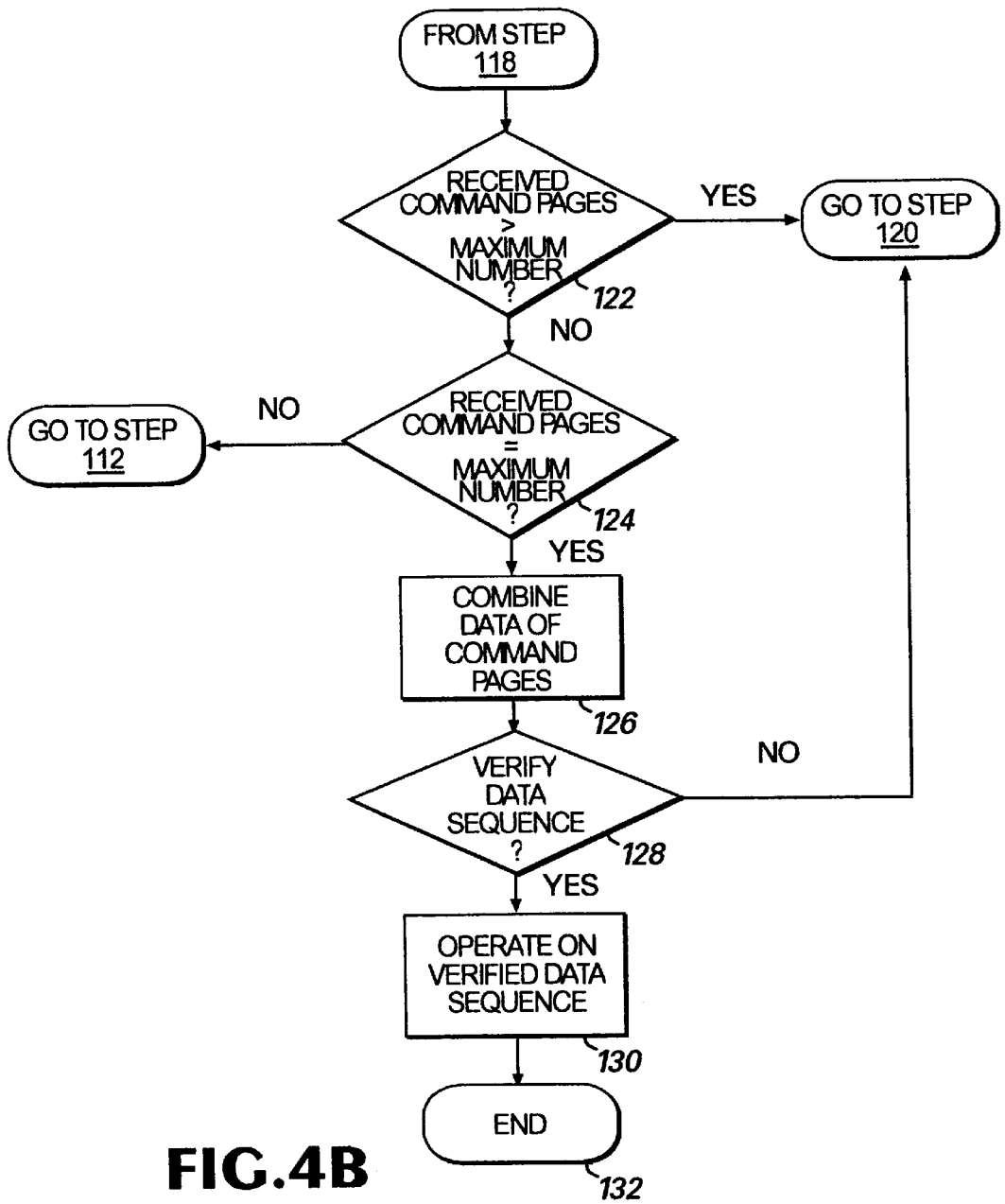

FIGS. 4A and 4B, collectively described as FIG. 4, logical flow diagrams illustrating the steps for communicating an extended data sequence by sending multiple pages via the cellular network control channel and combining the data content of these pages to form an aggregate message. Referring now to FIGS. 1, 4A and 4B, the communication process begins at the START step 100, wherein the cellular communications device 34 operates in a normal operating state. The cellular communications device 34 can send a data message via the RECC to the MSC 24 in the normal operating state. In addition, the cellular communications device 34 can respond to a single discrete page that operates to poll the cellular device. As part of this normal operating state, the cellular communications device 34 monitors the FOCC of the cellular network control channel 38 for pages in step 102. The cellular communications device responds to a received page by comparing the page to one or more masks maintained in its memory, such as the memory 76 (FIG. 3). A match typically determines the course of action to be taken by the cellular communications device in response to the received page. A mask can correspond to a MIN or an IMSI carried by a page or "triggering" message transmitted by the MSC. For example, as described in U.S. Pat. No. 5,530,736, assigned to the assignee for the present application, a radiotelephone can have multiple MINs, wherein multiple MINs can be simultaneously active for any particular time period. The subject matter of U.S. Pat. No. 5,530,736 is hereby fully incorporated herein by reference.

In step 104, an inquiry is conducted to determine whether a page has been received that includes a predetermined characteristic. The page having the predetermined characteristic is preferably formatted is preferably formatted to represent at least a portion of the digits of a mobile telephone number or MIN of a CMR system. The cellular communications device 34 determines that it has received a page containing a predetermined characteristic by comparing the received page to a particular mask maintained in memory, such as the memory 76 (Fig.3). This particular mask corresponds to the predetermined characteristic. A match resulting from this comparison confirms that a page having a predetermined characteristic has been received by the cellular communications device. If the response to the inquiry in step 104 is negative, the "NO" branch is followed to step 102 and the monitoring process continues. Alternatively, if the mask maintained by the receiving device matches the received page, then the "YES" branch is followed to step 106.

For the preferred embodiment, the predetermined characteristic can be a unique set of digits formatted to represent a portion of a MIN and allocated on the basis of geographical region. For example, a predetermined characteristic for the Atlanta region is typically different from the predetermined characteristic assigned for use in Pittsburgh.

In step 106, the cellular communications device 34 responds to the page having a predetermined characteristic by transitioning from the normal state to the receive device identifier state. The cellular communications device operates in step 106 to monitor the FOCC for a page having a special identifier. Each cellular communications device 34 is assigned a unique specific identifier or address that allows the MSC 24 to selectively communicate with a desired cellular communications device. To determine if a page contains the specific identifier assigned to a selected cellular communications device, a comparison is conducted to examine whether a page containing the specific identifier matches a mask maintained in memory such as the 76 (FIG. 3). A match resulting from this comparison task confirms that the page contains the specific identifier and should therefore be accepted by the receiving device.

Typically, a set of masks can be assigned to a particular cellular communications device and stored within nonvolatile memory for comparison to received pages. Similar to the predetermined characteristic, the page having the specific identifier is preferably formatted to represent at least a portion of a mobile telephone number or MIN of a CMR system. For the preferred cellular communications device 34, a set of up to ten masks correspond to a specific identifier and are stored within non-volatile memory.

In step 108, an inquiry is conducted by the cellular communications device 34 to determine whether a received page contains the specific identifier. If the comparison of the received page to each mask corresponding to the specific identifier does not result in a match, then the "NO" branch is followed to step 110. A determination is made in step 110 whether a timer having a predetermined time period has expired. If so, the "YES" branch is followed from step 110 to step 102 and the cellular communications device returns to the normal state. If the timer has not yet timed-out, the "NO" branch is followed to step 106 and the cellular communications device continues to monitor the cellular network control channel for a page containing a specific identifier. It will be appreciated that the timer in step 110 is useful for defining a maximum amount of time that will be spent by the cellular communications device in looking for a page having the special identifier. This predetermined time period is preferably set to a maximum time period of sixty seconds.

If the response in the inquiry conducted in step 108 is positive, the "YES" branch is followed from step 108 to step 112 because the received page contains a special identifier. In response, the cellular communications device transitions from the receive device identifier state to a receive data state. In step 112, the cellular communications device identified by the specific identifier operates to monitor the FOCC for pages containing commands. Each command page preferably includes the predetermined characteristic and one or more characters or digits corresponding to a recognized command. For the preferred embodiment, the least significant digit of a page containing the predetermined characteristic is designated to represent a particular command. In the receive data state, the selected cellular communications device determines that a received page represents a command page by determining that the received page contains the predetermined characteristic and has a least significant digit corresponding to a recognized command. Representative commands include the following control actions: (1) load busy idle bit (BIB) data values; (2) set a predetermined time for a timer device connected to the selected cellular communications device; and (3) accept data values contained in a certain portion of the page having the command.

In step 114, an inquiry is conducted by the selected cellular communications device to determine whether it has received a page containing a command. If the response is negative, the "NO" branch is followed to step 116. In step 116 a determination is made whether a timer having a known time period has expired. If so, the "NO" branch is followed from step 116 to step 112 and the monitoring operation for command pages is continued. In contrast, if the timer has timed out, the "YES" branch is followed from step 116 to step 102 and the selected cellular communications device returns to the normal state. It will be appreciated that the timer effectively limits the amount of time that will be spent by the selected cellular communications device in monitoring for an initial command page prior to returning to the normal state.

If the inquiry in step 114 confirms that a page having a command has been received by the selected cellular communications device, then the "YES" branch is followed to step 118. In step 118, a determination is made whether a time period defining the maximum time interval for receiving a consecutive pair of command pages has expired. If so, the "YES" branch is followed to step 120. In step 120, the content of each received command page is discarded. In turn, the process branches to step 102 from step 120 and the selected cellular communications device returns to the normal state. If the inquiry in step 118 offers a negative response, the "YES" branch is followed to step 122.

An inquiry is conducted in step 122 to determine whether the number of received command pages is greater than a predetermined number representing a maximum number of received command pages. If the number of received command pages exceeds the predetermined number, then the "YES" branch is followed from step 122 to step 120 and the data content for the received command pages is discarded. In the event that the number of command pages is less than or equal to the predetermined number, the "NO" branch is followed from step 122 to step 124.

It will be understood that the quantity assigned to the maximum number of received command pages determines the maximum length of the data sequence that will be formed by combining the data content of each received command page. If an excessive number of command pages are received while the cellular communications device is operating in the receive data state, then the data corresponding to the received command pages is discarded in step 120 and the selected cellular communications device returns to the normal operating state.

In step 124, a determination is made whether the number of received command pages is equal to the predetermined number, i.e., the maximum number of received command pages. If not, the "NO" branch is followed from step 124 to step 112 to continue the monitoring operation for command pages in the receive data state. However, if the response to the inquiry in step 124 is positive, the "YES" branch is followed to step 126.

In step 126, the data content for each received command page is accepted and combined to form a data sequence. This data sequence is preferably ordered by combining the data content in the reception order of the received command pages, i.e., ordered by time of arrival at the reception site. Alternatively, the data values of the data sequence can be ordered based on a sequence number assigned to each of the command pages. For example, each command page can include a sequence number and the received command pages can be ordered in numerical fashion based on the sequence number of each received page.

The aggregate message representing the data content of multiple pages is examined in step 128 for verification purposes. If the aggregate message is verified, the "YES" branch is followed to step 130. If the aggregate message cannot be verified in step 128, then the "NO" branch is followed to step 120 and all data is discarded.

In step 130, the data sequence of the aggregate message is operated upon by the selected cellular communications device in accordance with the command associated with the received command pages. At the END step 132, the selected cellular communications device returns to the normal operating state.

Figure 5:
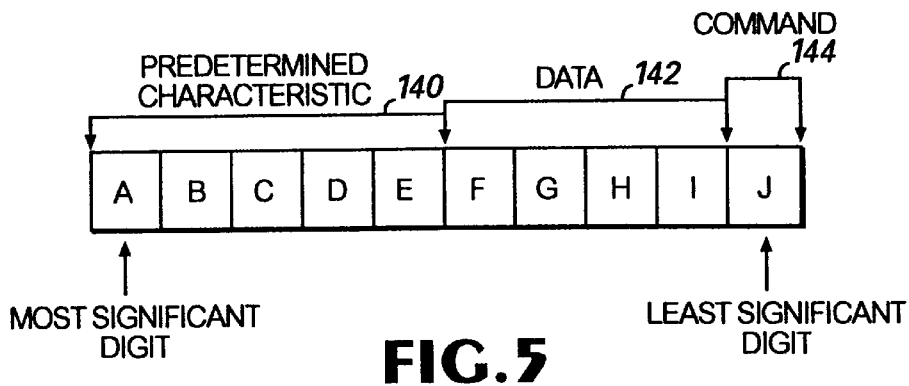
FIG. 5 is a diagram that shows the format for a page that is transmitted by a MSC to a cellular communications device via a cellular network control channel in accordance with an embodiment of the present invention.

FIG. 5 is a diagram showing the format for a page containing a command. To remain consistent with the format defined for a conventional page of a CMR system, the command page includes a set of digits that represents a mobile telephone number (MIN). For the preferred format, the ten available digits of a MIN are used to represent a predetermined characteristic 140, a data set 142, and a command 144. The predetermined characteristic 140 comprises the five most significant digits of the MIN, as shown by the characters A–E in FIG. 5. The next four digits, which are represented by the characters F–H of the MIN, can be used for data values of a data set 142. The single remaining digit of the MIN, the least significant digit, represents a command 144. This least significant digit of a command page is used to identify the action to be performed in response to the command page.

Although the preferred format for the command page employs the five most significant digits of a MIN to represent the predetermined characteristic, it will be appreciated that the present invention is not limited to a command page having a predetermined characteristic field comprising five digits. Similarly, the present invention is not limited to a command page having a data set containing the next four most significant digits of a MIN, but can be extended to a data set containing a larger or smaller number of digits. Also, the present invention can be extended to a command page formatted as a MIN and having a command represented by more than one digit. Thus, the basic structure for the command page employed by the present invention includes data fields for a predetermined characteristic, data, and a command.

The predetermined characteristic 140, represented by the characters A–E, is typically assigned a default value and cellular devices capable of receiving the command page, such as the cellular communications device, are equipped with a mask corresponding to this predetermined characteristic. This mask, commonly called a COMMAND MIN mask, is typically assigned the default value of ABCDEaaaaa, wherein the "ABCDE" represents the predetermined characteristic 140 and the "a" is a wild card value. For the cellular communications device 34, this COMMAND MIN mask is programmable via a secured maintenance mode by applying the proper signal to an external port of the device. The COMMAND MIN mask is typically stored in non-volatile memory of the cellular communications device 34.

The data set 142, which is represented by the characters FGHI, are formatted to appear as the second to the fourth least significant digits of a MIN and are reserved for data content. Typical data content includes BIB values, date/time values, or a variable data set.

The least significant digit of the command page is assigned a predetermined value represented by the character "J" for a corresponding command 144 or action to be performed. For example, the command 144 for loading BIB values for use by the cellular communications device 34 is represented by the even/odd digit pair zero/one. The command 144 for setting a date/time sequence is represented by the even/odd digit pair of two/three. The command 144 for invoking a data sequence is represented by the even/odd pair of digits of six/seven. The command 144 for invoking the verification task is represented by the even/odd pair of digits of eight/nine. For each of these representative commands, either the odd or even digit of the digit pair can be used to represent the corresponding command.

The least significant digit of a MIN is used to represent a command 144 in the preferred communications system because some low-power processors used by cellular devices are typically programmed to monitor only one of a pair of "virtual" data streams carried by the FOCC. This supports the conservation of power for processor operations. By convention, the FOCC includes two virtual data streams, stream "a" and stream "b". All even-numbered MINs are carried in stream a and all odd-numbered MINs are carried in the remaining stream b. This division of the pair of data streams in the FOCC between even and odd MINs enables a cellular device to only monitor half of all MIN-type signals and, consequently, to minimize the power consumed for this monitoring operation.

Because certain low-powered cellular devices will only receive either even or odd MINs, an even/odd digit pair is assigned to represent each command. If a low-powered radio is limited to receiving only even/odd MINs, then the least significant digit of the MIN can represent only five of the normal ten states of decimal digits. In other words, the low-powered radio will either receive a least significant digit from one of a pair of sets of odd/even digits, namely the even set of 0, 2, 4, 6, 8 or the odd set of 1, 3, 5, 7, 9. By limiting the least significant digit to only five possible states, the least significant digit has minimal value for conveying data content. To derive some value for the least significant digit, this particular digit of the MIN is used to represent a command 144, thereby providing up to five different commands for the preferred communication system.

For higher-powered cellular devices capable of monitoring both data streams of the FOCC, the character representing a command could be placed anywhere within the ten-digit structure of the MIN. Indeed, if more than ten commands are required for an application, then more than a single digit can be used to represent a command within the command structure.

Although the format for the command page is based on the data structure for a MIN for a conventional page of a CMR system, it will be appreciated that the present invention is not limited to the particular format shown in FIG. 5. For other applications, there may be a need to use more or less characters for the predetermined characteristic, the data set, and the command to implement a command page modeled on the data structure of a MIN.

Tables 1, 2, 3 and 4 illustrate representative examples of the data structure for certain command-type pages. Table 1 illustrates the data structure for the load BIB command; Table 2 illustrates the data structure for the set time command; Table 3 illustrates the data structure for the generic data command; and Table 4 illustrates the data structure for the verification command.

TABLE 1

Data Structure for "Load BIB" Command: ABCDEFGHI[0/1]

| | |
|---|---|
| Predetermined characteristic: | ABCDE |
| Data Set: | FGHI |
| Data Value "FG": | high priority threshold: value=(1% to 100%) − 1 |
| Data Value "HI": | low priority threshold: value=(1% to 100%) − 1 |
| Command [0/1]: | the command "load BIB" is represented by the least significant digit 0 or 1 |

The "load BIB" command is an instruction to load into memory of the selected cellular communications device the data values defined by the data set "FGHI". The data value "FG" defines a high priority threshold value, whereas the data value "HI" defines a low priority threshold value. As described above with respect to FIG. 3, a cellular communications device can monitor BIB signals carried by the FOCC to enable a determination of the amount of activity on the RECC for a monitored cell of the CMR system. The cellular communications device can delay sending a data message to a MSC until the level of activity on the RECC is below a certain threshold level. The BIB data values of the "load BIB" command define maximum and minimum priority thresholds levels for use by the cellular communications device.

TABLE 2

Data Structure for "Set Date/Time" Command: ABCDEFGHI[2/3]

| | |
|---|---|
| Predetermined Characteristic: | ABCDE |
| Data Set: | FGHI |
| Data Value "FGHI": | a month/date value or a time value (hour/minute) |
| Command [2/3]: | the command "set date/time" is represented by the least significant digit 2 or 3 |

The "set data/time" command is an instruction that sets a predetermined time for a timer device connected to the selected cellular communications device. For an external timer, the selected cellular communications device can provide the defined data set to the external timer via an external data port. The data set "FGHI" can define either a month/date value or a hour/time value. For example, a data value of "1023" defines the date of October 23. and a data value of "1814" defines the time of 6:14 PM.

TABLE 3

Data Structure for Generic Data Command: ABCDEFGHI[6/7]

| | |
|---|---|
| Predetermined Characteristic: | ABDCE |
| Data Set: | FGHI |
| Data Value "FGHI" | Generic Data Values |
| Command [6/7]: | the command "invoke generic data" is represented by the least significant digit 6 or 7 |

The "generic data" command, also described as the invoke generic data command, is an instruction for loading a defined data set into memory of the selected cellular communications device. The data set "FGHI" can define a generic data set comprising four digits.

TABLE 4

Data Structure for Verification Command: ABCDEFGHI[8/9]

| | |
|---|---|
| Predetermined Characteristic: | ABDCE |
| Data Set: | FGHI |
| Data Value "FGHI" | Verification Data Term |
| Command [8/9]: | the verification command is represented by the least significant digit 8 or 9 |

The "verification" command is an instruction for verifying a data sequence received by the selected cellular communications device in a predetermined number of previously received command pages. The data set "FGHI" defines a verification term for comparison to a verification value calculated based on the data sets of the prior received command pages. In response to the verification command, the selected cellular communications device can calculate the verification value and thereafter compare this value to the verification term of the verification page. If a match results from this comparison, then the data sequence can be accepted for operation by the cellular communications device.

Figure 6:
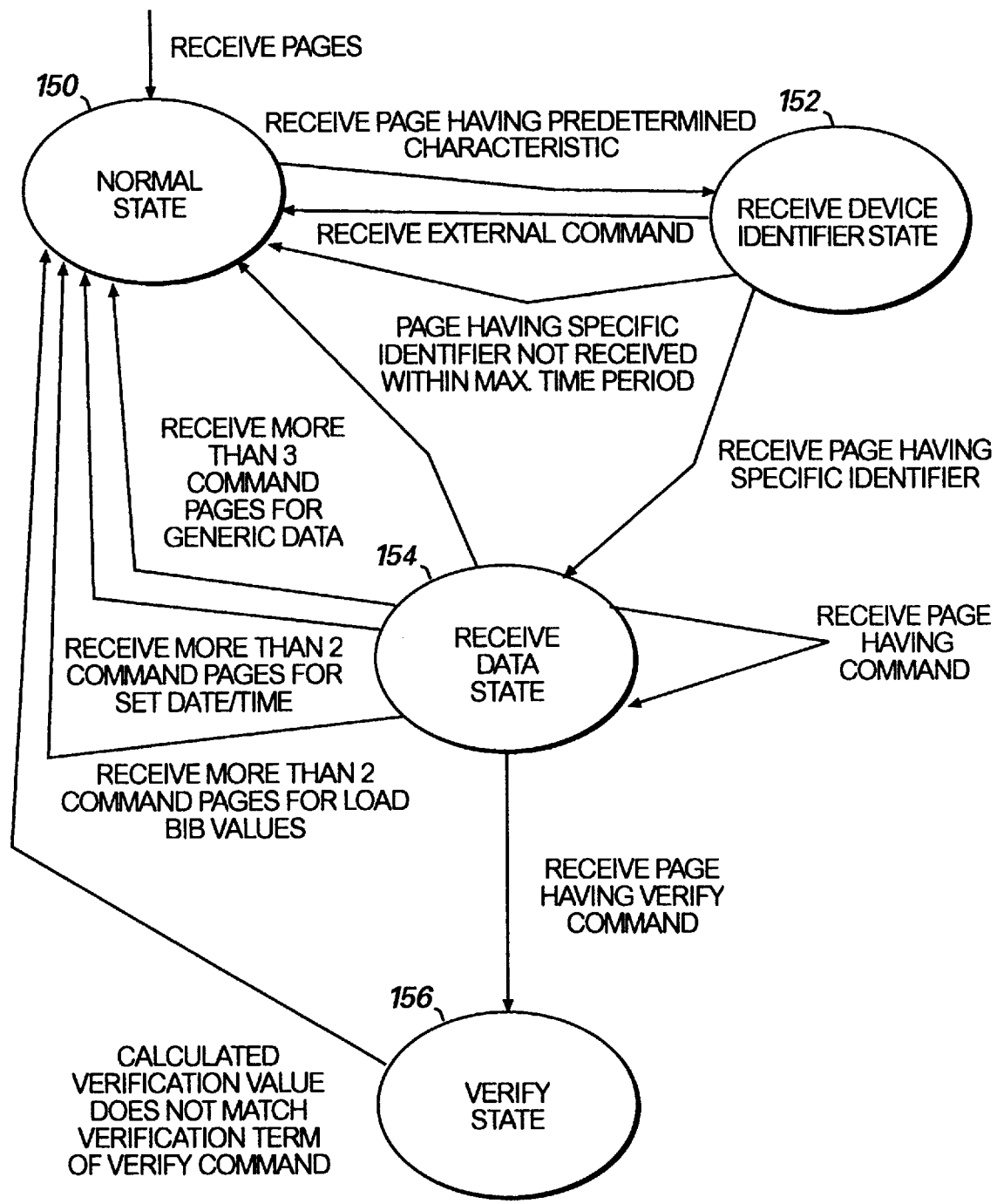
FIG. 6 is a state diagram illustrating the states of operation for a selected cellular communications device of a data reporting system in accordance with an embodiment of the present invention.

FIG. 6 is a state diagram illustrating the various operating states for cellular-compatible devices capable of receiving pages from an MSC of a CMR system in accordance with the present invention. Referring now to FIGS. 1 and 6, the initial operating state for the cellular communications device is the normal operating state 150. In the normal state 150, a cellular communications device 34 operates to forward data messages via the RECC of the cellular network control channel 38 to the MSC 24. In addition, the cellular communications device 34 can respond to single discrete page messages, rather than an ordered sequence of multiple pages, transmitted by the MSC 24 over the FOCC. Consequently, the cellular communications device 34 typically monitors the FOCC for pages while operating in the normal state 150. In response to receiving a page having a predetermined characteristic, the receiving device exits the normal state 150 and enters the receive device identifier state 152.

In the receive device identifier state 152, the cellular communications device 34 monitors the FOCC for a page containing a specific identifier assigned to that device. In the event that it receives a page containing the specific identifier, the receiving device will assume that this page is targeted for itself and will therefore enter the receive data state 154. However, if a page having the specific identifier is not received within a predetermined time period, preferably 60 seconds, then the cellular communications device 34 will exit the receive device identifier state 152 and re-enter the normal state 150. By setting a maximum time period for operation within the receive device identifier state 152, a cellular communications device 34 can terminate its dedicated task of monitoring the FOCC for a page containing its specific identifier upon expiration of this maximum time period.

The cellular communications device 34 also can exit the receive device identifier state 152 and return to the normal state 150 in response to receiving certain command signals via an external port. These command signals include a Registration command and an Initialize command. The Registration command instructs the cellular communications device to register with the CMR system, whereas the Initialize command serves to initialize the cellular communications device. Once returning to the normal state 150, the cellular communications device 34 will process the command received via the external port. Thus, the application of certain command signals to an external port of the cellular communications device 34 will force the device to return to the normal state 150.

In response to receiving a page containing a specific identifier that matches any of the masks maintained in memory, the receiving device will transition from the receive device identifier state 152 to the receive data state 154. Significantly, only those cellular communications devices receiving a page containing a specific identifier that matches a mask maintained by that device can enter the receive data state 154. This enables the selective communication of a data sequence by sending a multiple page set that will be received and decoded by a subset of possible receiving devices within the coverage area of the CMR system.

A cellular communications device 34 operating in the receive data state 154 monitors the FOCC for pages containing commands. For the preferred embodiment, these commands include the "load BIB" command, the set "date/time" command, the generic data command, and the verification command. If the cellular communications device 34 receives a page containing a command, then the data content associated with the command will be accepted and used if a subsequent verification task is successful.

To increase data capacity, a minimum number of pages containing commands should be received to accept the data content formed by combining the data of these pages. However, if the number of pages containing commands exceeds a maximum threshold while the cellular communications device operates in the receive data state, the data content for the received command pages will be discarded. Consequently, a predetermined number of pages containing a command is preferably received by the cellular communications device in the receive data state prior to acceptance of the data values.

In the event that the cellular communications device 34 is operating in the receive data state 154 and has received a page comprising the predetermined characteristic and has a least significant digit of 0 or 1, then the data content of this page will be used to invoke a "load BIB" command if a subsequent verification task is successful. If the cellular communications device 34 receives a page comprising the predetermined characteristic and has a least significant digit of 2 or 3, then the data content for this matching page will be used to invoke a "set date/time" command if subsequent verification is successful. If the cellular communications device 34 is in the receive data state 154 and receives a page comprising the predetermined characteristic and a least significant digit of 6 or 7, then the receiving device will capture and store the data content. This stored data will be output as a serial bus packet via an external port only if a subsequent verification task is successfully completed. The verification task is initiated when the cellular communications device 34 exits the receive data state and enters the verify state 156 in response to a verify command.

The cellular communications device 34 exits the receive data state 154 and enters the verify state 156 in response to receiving a page having the predetermined characteristic and a least significant digit of 8 or 9. The data content of this page constitutes a verification term. While operating in the verify state 156, the cellular communications device 34 will compute a verification value based on the data content obtained from received command pages. In the event that the calculation of the verification value fails to match the verification term of the verify page, then the entire data sequence will be discarded and the device will return to the normal state 150. In contrast, if calculated verification value matches the verification term, then the cellular communications device 34 accepts the data sequence for the received command pages and operates upon this data sequence in accordance with the command. The cellular communications device 34 can then return to the normal state 150 in response to accepting the data sequence.

While operating in the receive data state 154, the cellular communications device 34 will discard an entire data sequence in the event that the device receives more than two commands comprising the predetermined characteristic and a least significant digit of 0 or 1. Thus, a maximum number of two command pages having the "load BIB" command will be accepted by the cellular communications device while it operates in the receive data state.

If the cellular communications device 34 is operating in the receive data state 154 and receives more than two pages comprising the predetermined characteristic and a least significant digit of 2 or 3, then the receiving device will discard the entire data sequence and return to the normal state 150. Consequently, the cellular communications device will accept a maximum of two "set date/time" command pages while operating in the receive data state 154.

While operating in the receive data state 154, and the cellular communications device 34 receives more than three pages comprising the predetermined characteristic and a least significant digit of 6 or 7, then the entire data sequence for the received pages will be discarded and the receiving device will return to the normal state 150. In this manner, a maximum of three command pages for generic data can be accepted for processing by the cellular communications device 34 while operating in the receive data state 154.

Tables 5, 6, and 7 illustrate representative examples of the communication of an aggregate message by sending multiple pages via the FOCC of a CMR system and combining the data sets of these pages to form the aggregate message. Table 5 illustrates a sequence of command pages to invoke the "load BIB" command. Table 6 illustrates a sequence of command pages to invoke the "set date/time" command. Table 7 illustrates a sequence of command pages to invoke the "generic data" command.

TABLE 5

Sequence of Page Commands to Invoke Load BIB Command

Page 1: 0001000010
Reception of page containing Predetermined Characteristic "00010" and Command "0" causes receiving device to enter receive device identifier state for the Load BIB command.

Page 2: 0010001234
Reception of page containing Specific Identifier ("0010001234") assigned to receiving device causes it to enter the receive data state.

Page 3: 0001079590
Reception of page containing Predetermined Characteristic "00010", Data Values 79 and 59, and Command "0" causes receiving device to receive BIB values of 80% high threshold and 60% low threshold.

Page 4: 0001001348
Reception of page containing Predetermined Characteristic "00010" and Command "8" causes receiving device to verify the data sequence provided by the previously received command pages. "134" is the verification term, and "134" is the computed verification value for the data set "7959" of page 3.

TABLE 6

Sequence of Page Commands to Invoke Set Date/ Time Command

Page 1: 0001010023
Reception of page containing Predetermined Characteristic "00010" and Command "3" causes receiving device to enter receive device identifier state for "set date/time" command.

Page 2: 0010001234
Reception of page containing Specific Identifier ("0010001234") assigned to receiving device causes it to enter the receive data state.

Page 3: 0001010233
Reception of page containing Predetermined Characteristic "00010" and Command "3" causes receiving device to receive date value ("1023") of October, 23.

Page 4: 0001018143
Reception of page containing Predetermined Characteristic "00010" and Command "3" causes receiving device to receive date value ("1814") of 6:14 PM.

Page 5: 0001001879
Reception of page containing Predetermined Characteristic "00010" and Command "9" causes receiving device to verify the data sequence provided by the previously received command pages. "187" is the verification value, and "187" is the computed verification term for the data sequence formed by the combination of the data set of "1023" of page 3 and the data set of "1814" of page 4.

TABLE 7

Sequence of Page Commands to Invoke Generic Data Command

Page 1: 0001010326
Reception of page containing Predetermined Characteristic "00010" and Command "6" causes receiving device to enter receive device identifier state for "generic data" command.

Page 2: 0010001234
Reception of page containing Specific Identifier ("0010001234") assigned to receiving device causes it to enter the receive data state.

Page 3: 0001012346
Reception of page containing Predetermined Characteristic "00010" and Command "6" causes receiving device to receive date payload of 1234.

Page 4: 0001056785
Reception of page containing Predetermined Characteristic "00010" and Command "6" causes receiving device to receive data payload of 5678.

Page 5: 0001002058

Reception of page containing Predetermined Characteristic "00010" and Command "8" causes receiving device to verify the data sequence provided by the previously received command pages. "205" is the verification value, and "205" is the computed verification term for the data sequence formed by the combination of the data set of "1234" of page 3 and the data set of "5678" of page 4.

Figure 7:
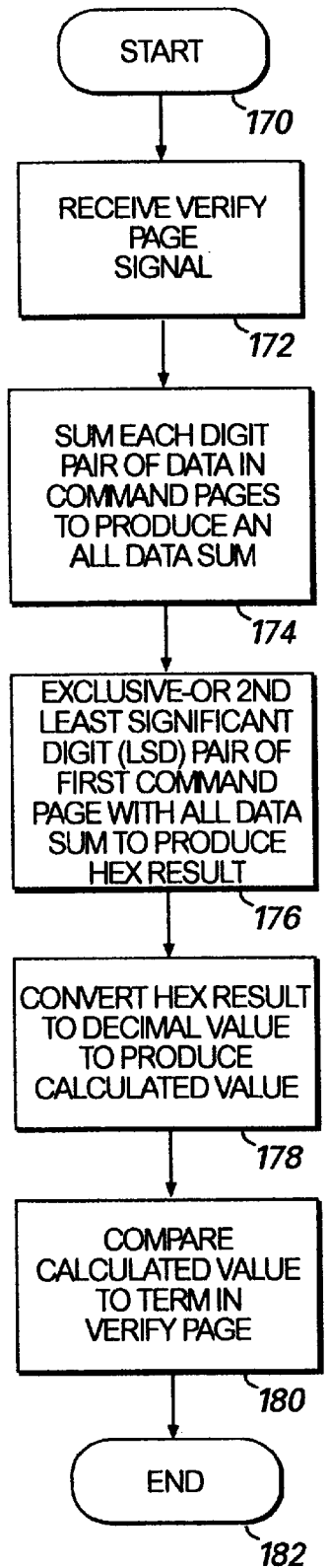
FIG. 7 is a logical flow diagram illustrating a method for verifying accurate reception of data obtained in response to receiving pages containing commands in accordance with an embodiment of the present invention.

FIG. 7 is a logical flow diagram illustrating a method for verifying accurate reception of data obtained in response to receiving pages containing commands in accordance with an embodiment of the present invention. Referring now to FIGS. 1 and 7, the verification method begins at the START step 170 in response to receiving a page containing a verification command. In step 172, the cellular communications device 34 determines that it has received a page containing a verification command and thereafter obtains the verification term from the verification page. For the preferred data structure of the verification page, the verification value is a three-digit decimal value placed between the predetermined characteristic and the command.

In step 174, the cellular communications device 34 obtains the data set for each received command page and calculates a data sum by adding each digit pair for each data set of the received command pages. Each digit pair of each command page is treated as a hexadecimal byte and summed into an eight-bit value. Any overflow resulting from this sum operation is ignored.

In step 176, an exclusive-or calculation is conducted for the data sum of step 174 and the second least significant digit pair of the first command page of the set of command pages received by the cellular communications device 34. The second least significant digit of the first command page is treated as a hexadecimal byte value for this exclusive-or operation.

In step 178, the hexadecimal value resulting from the exclusive-or operation of step 176 is converted to a three-digit decimal value. This three-digit decimal value represents the calculated verification value. In step 180, the calculated verification value is compared to the verification term provided by the verification page. In the event that a match results from this comparison operation, the data sequence formed by the combination of the data sets is accepted for operation by the cellular communications device 34. Otherwise, the data sequence is discarded and the cellular communications device returns to the normal state. The verification process terminates at the END step 182.

The encryption process associated with the initial computation of the verification value carried by the verification page is desirable because it is not a computation intensive operation, and yet employs a sufficient encryption of the data set to frustrate modest attempts by an eavesdropper of the CMR system to hack or otherwise decode the data set. The present invention is not limited to the verification process described above with respect to FIG. 7 or its corresponding encryption process. For example, other verification techniques can be used, including CRC or exclusive-or techniques.

Figure 8:
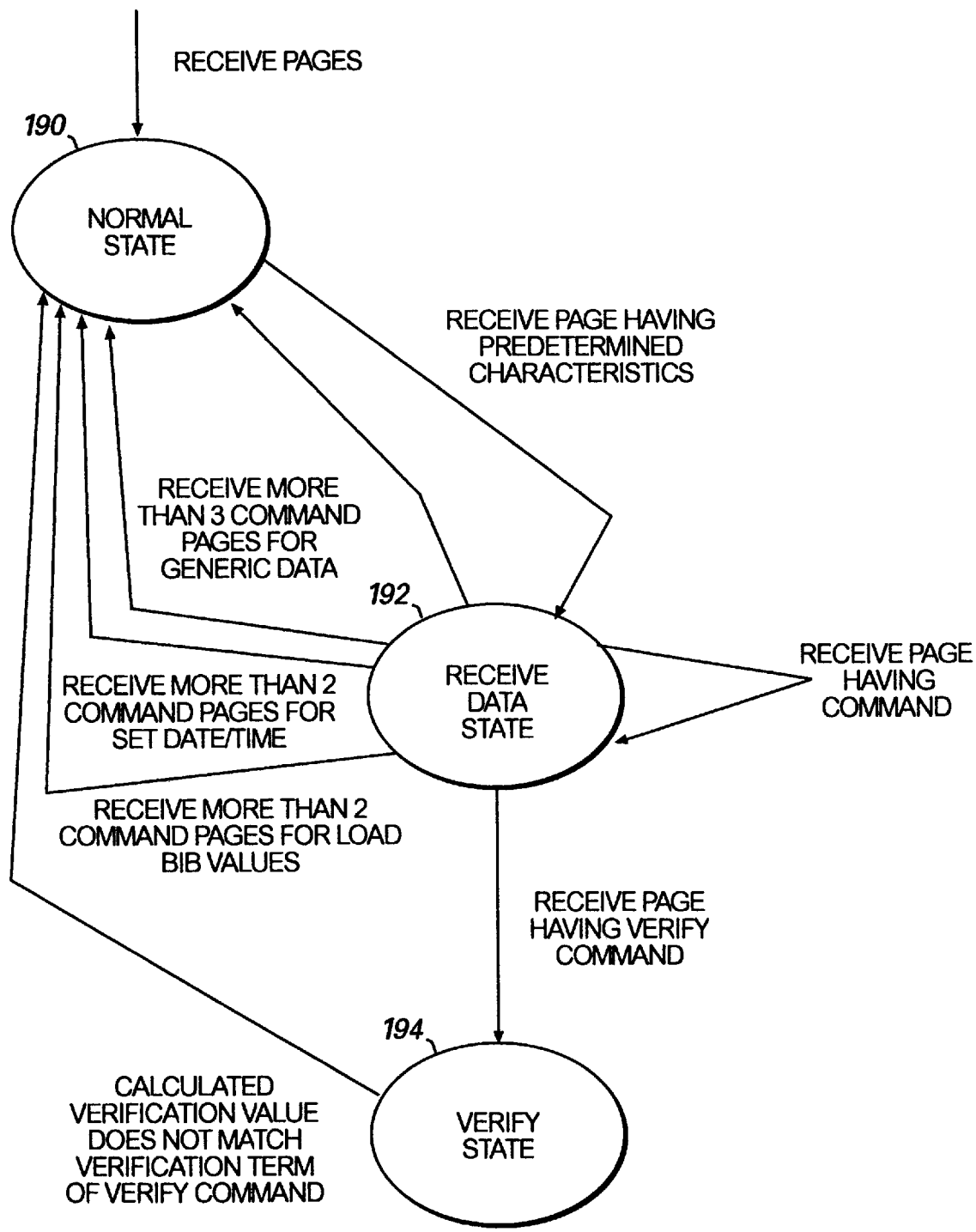
FIG. 8 is a state diagram illustrating the states of operation for cellular communications devices of a data reporting system in accordance with an alternative embodiment of the present invention.

FIG. 8 is a state diagram illustrating various operating states for cellular-compatible devices capable of receiving pages from an MSC of a CMR system. In contrast to a data reception operation conducted by selected cellular communications device(s), as illustrated by the state diagram of FIG. 6, the data reception state in FIG. 8 is entered by each cellular communication device that receives a particular page while operating in the normal state. Thus, the state diagram in FIG. 8 illustrates the operational states for cellular communications devices capable of receiving command pages transmitted by the MSC in a "broadcast" manner. For this broadcast-style communication of pages containing a combination of commands and data, there is no requirement to send a page containing a specific identifier to cause a cellular communications device to enter the receive data state. Each cellular communications device receiving a page containing a predetermined characteristic while in the normal state can enter the receive data state.

The predetermined characteristic for the page described with respect to FIG. 8 is different from the predetermined characteristic described with respect to FIG. 6 to permit the separation between selected communication and broadcast communication operations. Selected communications operations are typically conducted to send data to one or more cellular communications devices selected from a possible set of devices, whereas broadcast communication operations are conducted to transmit data to all available cellular communication devices capable of receiving the particular page that causes these devices to transition from the normal state and to enter the receive data state.

Referring now to FIGS. 1 and 8, the initial operating state for the cellular communications device is the normal operating state 190. In the normal state 190, a cellular communications device 34 operates to forward data messages via the RECC to the MSC 24 and can respond to single discrete page messages, rather than an ordered sequence of multiple pages, transmitted by the MSC 24 over the FOCC. Each cellular communications device typically monitors the FOCC for pages operating while in the normal state 190. In response to receiving a page having a predetermined characteristic, the receiving device exits the normal state 190 and enters the receive data state 192. Specifically, all cellular communications devices receiving a page containing a predetermined characteristic that matches a mask maintained by those devices can enter the receive data state 192. The predetermined characteristic of this page is different from the predetermined characteristic carried by the page described above with respect to FIGS. 6 and 7. This use of different predetermined characteristics for these pages permits a cellular communication device to distinguish between the communication tasks associated with the pair of pages.

A cellular communications device 34 operating in the receive data state 192 monitors the FOCC for pages containing commands. Similar to the commands described with respect to FIG. 6, the commands include the "load BIB" command, the set "date/time" command, the generic data command, and the verification command. If the cellular communications device 34 receives a page containing a command, then the data content associated with the command will be accepted and used in the event that a subsequent verification task is successful. Moreover, a predetermined number of pages containing the same command must be received by the cellular communications device in the receive data state prior to any acceptance of the data values.

In the event that the cellular communications device 34 is operating in the receive data state 192 and has received a command page comprising the predetermined characteristic and a least significant digit of 0 or 1, then the data content of this page will be used to invoke a "load BIB" command if a subsequent verification task is successful. If the cellular communications device 34 receives a command page comprising the predetermined characteristic and a least significant digit of 2 or 3, then the data content for this matching page will be used to invoke a "set date/time" command if subsequent verification is successful. If the cellular communications device 34 is in the receive data state 192 and receives a command page comprising the predetermined characteristic and a least significant digit of 6 or 7, then the receiving device will capture and store the data content. This stored data will be output via an external port only if a subsequent verification task is successfully completed. The verification task is initiated when the cellular communications device 34 exits the receive data state and enters the verify state 194 in response to a page containing a verification command.

The cellular communications device 34 exits the receive data state 192 and enters the verify state 194 in response to receiving a page having the predetermined characteristic and a least significant digit of 8 or 9. The data content of this command page constitutes a verification term. While operating in the verify state 196, the cellular communications device 34 will compute a verification value based on the data content obtained from received command pages. In the event that the calculation of the verification value fails to match the verification term of the verify page, then the entire data sequence will be discarded and the device will return to the normal state 190. In contrast, if calculated verification value matches the verification term, then the cellular communications device 34 accepts the data sequence for the received command pages and operates upon this data sequence in accordance with the command. The cellular communications device 34 then returns to the normal state 190 in response to accepting the data sequence.

A maximum number of two command pages having the "load BIB" command will be accepted by the cellular communications device 34 while it operates in the receive data state. Similarly, the cellular communications device will accept a maximum of two "set date/time" command pages while operating in the receive data state. Likewise, a maximum of three command pages for generic data can be accepted for processing by the cellular communications device 34 while operating in the receive data state.

Tables 8, 9, and 10 illustrate representative examples of the broadcast communication of an aggregate message by sending multiple pages via the FOCC of a CMR system and combining the data sets of these pages to form the aggregate message. Table 8 illustrates a sequence of page commands to invoke the "load BIB" command. Table 9 illustrates a sequence of page commands to invoke the "set date/time. command". Table 10 illustrates a sequence of page commands to invoke the "generic data" command.

TABLE 8

Sequence of Page Commands to Invoke Load BIB Command

Page 1: 0010000010
Reception of page containing Predetermined Characteristic "00100" and Command "0" causes receiving device to enter receive data state for Load BIB command.
Page 2: 0010079590
Reception of page containing Predetermined Characteristic "00100", Data Values 79 and 59, and Command "0" causes receiving device to receive BIB values of 80% high threshold and 60% low threshold.
Page 3: 0010002198
Reception of page containing Predetermined Characteristic "00100" and Command "8" causes each receiving device to verify the data sequence provided by the previously received command pages. "219" is the verification value, and "219" is the computed verification term for the data set "7959" of page 2.

TABLE 9

Sequence of Page Commands to Invoke Set Date/ Time Command

Page 1: 0010010023
Reception of page containing Predetermined Characteristic "00010" and Command "3" causes each receiving device to enter receive data state for "set date/time" command.
Page 2: 0010010233
Reception of page containing Predetermined Characteristic "00100" and Command "3" causes each receiving device to receive a date value ("1023") of October 23.
Page 3: 0010018143
Reception of page containing Predetermined Characteristic "00010" and Command "3" causes each receiving device to receive a date value ("1814") of 6:14 PM.
Page 4: 0010000509
Reception of page containing Predetermined Characteristic "00100" and Command "9" causes receiving device to verify the data sequence provided by the previously received command pages. "050" is the verification value, and "050" is the computed verification term for the data sequence formed by the combination of the data set of "1023" of page 2 and the data set of "1814" of page 3.

TABLE 10

Sequence of Page Commands to Invoke Generic Data Command

Page 1: 0010010326
Reception of page containing Predetermined Characteristic "00100" and Command "6" causes receiving device to enter receive device identifier state for "generic data" command.
Page 2: 0010012346
Reception of page containing Predetermined Characteristic "00100" and Command "6" causes each receiving device to receive a data payload of 1234.
Page 3: 0001056785
Reception of page containing Predetermined Characteristic "00100" and Command "6" causes each receiving device to receive a data payload of 5678.
Page 4: 0001001868
Reception of page containing Predetermined Characteristic "00100" and Command "8" causes each receiving device to verify the data sequence provided by the previously received command pages. "186" is the verification value, and "186" is the computed verification term for the data sequence formed by the combination of the data set of "1234" of page 2 and the data set of "5678" of page 3.

In summary, the present invention provides a system for communicating multiple page message or pages via a cellular network control channel to a cellular-compatible receiving device and combining the data obtained from each received page to form an aggregate message comprising an ordered data sequence. By sending multiple pages and combining the data of these pages at the reception site, an increase in data communication capacity can be achieved for CMR system.

For the preferred operating environment of a data message system, a cellular communications device operates in a normal operating state and monitors the FOCC of the cellular network control channel for pages. The cellular communications device responds to a received page by comparing the received page to one or more masks maintained in its memory. A match typically determines the course of action to be taken by the cellular communications device in response to the received page. For example, if the received page contains a predetermined characteristic and matches a corresponding mask, then the cellular communications device responds by transitioning from the normal state to a receive device identifier state.

In the receive device identifier step, the cellular communications device operates to monitor the FOCC for a page having a special identifier. Each cellular communications device is typically assigned a special identifier, which serves to uniquely identify the device. To determine if a page contains the specific identifier assigned to the cellular communications device, a comparison is conducted to examine whether a received page matches a mask corresponding to the special identifier and maintained in memory of the selected device. A match resulting from this comparison task confirms that the page contains the specific identifier and should therefore be accepted by the receiving device. In response, the cellular communications device transitions from the received device identifier state to a receive data state.

In the receive data state, the cellular communications device operates to monitor the FOCC for pages containing commands. Each page command can contain a command and a data set. The data content for each received command page is accepted and combined to form a data sequence. This data sequence can be ordered by combining the data content in the reception order of the received command pages. Alternatively, the data values of the data sequence can be ordered based on a sequence number assigned to each of the command pages.

The aggregate message representing the data content of multiple pages can examined for verification purposes in response to reception by the cellular communications device of a page containing a verification command. The cellular communications state can enter a verification state in response to the verification page. If the aggregate message is verified, then the data sequence of the aggregate message is operated upon by the selected cellular communications device in accordance with the command associated with the received command pages. The selected cellular communications device then returns to the normal operating state.

If the received page contains a different predetermined characteristic, and it matches another corresponding mask maintained by the cellular communications device, then the cellular communications device responds by transitioning from the normal state to the receive data state. Each cellular communications device can include a mask corresponding to this alternative predetermined characteristic. Consequently, each receiving device can directly transition to the receive data state, rather than the receive device identifier state, in response to a page containing this alternative predetermined characteristic. This supports the communication of a data sequence via a multiple set of pages to a general group of cellular communications devices rather than to one or more selected receiving devices.

It should be understood that the particular embodiments described herein have been disclosed by way of example and that other modifications may occur to those skilled in the art without departing from the scope and spirit of the appended claims.

I claim:

1. A method for communicating with a selected one of a plurality of cellular communications devices by sending multiple pages via a cellular network control channel of a cellular mobile radiotelephone (CMR) system, comprising the steps of:

monitoring the cellular network control channel for one of the pages having a specific identifier assigned to the selected cellular communications device in response to receiving one of the pages having a predetermined characteristic;

monitoring the cellular network control channel for pages containing a command in response to receiving the page having the specific identifier; and responsive to receiving pages containing the command, combining data from each of the pages to form an aggregate data message containing a sequence of the data.

2. The method of claim 1 further comprising the steps of:

monitoring the cellular network control channel for one of the pages containing another command in response to receiving the command pages;

verifying the data sequence of the aggregate data message in response to receiving the page containing the other command.

3. The method of claim 2 further comprising the step of discarding the data sequence in the event that a verification term of the other command page does not match a verification value calculated with the data of the data sequence.

4. The method of claim 2 further comprising the step of discarding the data sequence in the event that the other command page is not received within a certain maximum time period.

5. The method of claim 2 further comprising the step of discarding the data sequence in the event that a time period between any pair of received command pages exceeds a certain maximum time period.

6. The method of claim 2 further comprising the step of discarding the data sequence in response to receiving more than a predetermined number of pages containing the command while monitoring the cellular network control channel.

7. The method of claim 2 further comprising the step of responding to the verification of the data sequence by operating on the data sequence in accordance with the command.

8. The method of claim 1, wherein the data combining step comprises ordering the data of each received command page based on the arrival of the corresponding command page at the selected cellular communication device.

9. The method of claim 1, wherein the data combining step comprises ordering each received command page in sequential order based on a numerical value contained in each command page.

10. The method of claim 1, wherein the step of receiving one of the pages having a predetermined characteristic comprises the steps of:

comparing at least a portion of the received page having the predetermined characteristic to a mask stored in memory of each cellular communications device; and accepting the page in the event that the portion of the page matches the mask.

11. The method of claim 10, wherein the page having the predetermined characteristic is formatted to represent at least a portion of a telephone number (MIN).

12. The method of claim 1, wherein the step of receiving one of the pages having a specific identifier comprises comparing at least a portion of the received page having the specific identifier to one of a set of masks stored in memory of the selected cellular communications device; and accepting the page in the event that the least a portion of the page matches one of the set of masks.

13. The method of claim 1, wherein the step of monitoring the cellular network control channel for one of the pages having a specific identifier assigned to the selected cellular communications device comprises:

monitoring the cellular network channel for a certain time period after receiving one of the pages having the predetermined characteristic; and terminating the monitoring step in the event that the certain time period expires without receiving one of the pages having the specific identifier.

14. The method of claim 1, wherein the command defines an action to load busy idle bit (BIB) data values, and the data sequence comprises BIB data.

15. The method of claim 1, wherein the command defines an action for the selected cellular communications device to set a predetermined time for a timer device connected to the selected cellular communications device, and the data sequence comprises timing data values corresponding to the predetermined time.

16. The method of claim 1, wherein the command defines an action for the selected cellular communications device to accept data values contained in a certain portion of each page containing the command, and to provide the data sequence comprising the data values to a device external to the selected cellular communications device.

17. The method of claim 1, wherein the page containing a command comprises digits of a telephone number (MIN), the command page having a format comprising certain digits of the telephone number that represent the predetermined characteristic, other digits of the telephone number that represent data values and a remaining digit of the telephone number that identifies the action associated with the command.

18. The method of claim 1 further comprising the steps of verifying the data provided by a predetermined number of pages containing the command by calculating a verification value in response to receiving a page containing another command, the calculation comprising the steps of:

summing each digit pair for the data of each page containing the command to produce a hex value-sum of all pages containing the command;

exclusive-oring the second least significant digit pair of the first page containing the command with the hex-value sum of all pages containing the command to produce a exclusive-or'ed sum;

converting the exclusive-or'ed sum into a decimal value to provide a calculated verification value; and comparing the calculated verification value to a verification term contained in the page containing another command.

19. A method for communicating with a selected one of a plurality of cellular communications devices by sending multiple pages via a cellular network control channel of a cellular mobile radiotelephone (CMR) system, comprising the steps of:

monitoring for pages on the forward control channel (FOCC) of the cellular network control channel;

comparing each received page to a first mask corresponding to a predetermined characteristic to determine if the received page has a portion that matches the predetermined characteristic;

in the event that the received page has a portion that matches the first mask, then monitoring the FOCC for one of the pages having a specific identifier assigned to the selected cellular communications device, comparing each received page to a second mask corresponding to the specific identifier to determine if the received page has a portion that matches the specific identifier;

in the event that one the received pages matches the second mask, then monitoring the FOCC for pages containing a command; and responsive to receiving a predetermined number of pages containing the command, accepting data from each of the predetermined number of pages to form an aggregate data message containing a sequence of the data.

20. The method of claim 19 further comprising the steps of:

monitoring the FOCC for one of the pages containing a command corresponding to a verification action in response to receiving the predetermined number of pages;

verifying the data of the aggregate data message in response to receiving the verification page; and operating on the data in accordance with the command in response to verifying the data sequence.

21. The method of claim 20 further comprising the step of discarding the data in the event that one of the following events arises: (1) a verification value of the verification page does not match a verification term calculated with the combined data of the data sequence, and (2) the verification page is not received within a certain predefined time period.

22. The method of claim 19 further comprising the step of discarding the data in the event that a time period between any pair of received command pages exceeds a certain maximum time period.

23. The method of claim 19 further comprising the step of discarding the data in response to receiving more than a predetermined number of pages containing the command while monitoring the cellular network control channel.

24. The method of claim 19, wherein the page having the predetermined characteristic is formatted to represent at least a portion of a telephone number (MIN); and the page containing a command formatted to represent at least a portion of another telephone number, the page comprising certain digits that represent the predetermined characteristic, other digits that represent data values and a remaining digit that identifies the action associated with the command.

25. A method for communicating a message by sending a predetermined sequence of pages to a selected one of a plurality of cellular communications devices via a cellular network control channel of a cellular mobile radiotelephone (CMR) system, comprising the steps of:

operating in a normal state, each cellular communications device operative to monitor for pages on the cellular network control channel in the normal state;

transitioning from the normal state and entering a receive device identifier state (COMIN_RCV_DEVID state) in response to receiving one of the pages having a predetermined characteristic and matching a first mask (COMIN-12) stored by each cellular communications device, each cellular communications device operative in the receive device identifier state to monitor the cellular network control channel for pages containing a specific identifier assigned to the cellular communications device;

transitioning from the receive device identifier state and entering the receive data state (COMIN_RCV_DATA state) in response to receiving one of the pages having the specific identifier and matching any one of a plurality of second masks assigned to a selected cellular communications device, the selected cellular communications device operative in the receive data state to monitor the cellular network control channel for pages containing commands;

receiving data in response to receiving a predetermined number of pages containing a command while the selected cellular communications device is in the receive data state (COMIN_RCV_DATA state), each command page having a portion that matches the first mask and a least significant digit representing one of the commands;

transitioning from the receive data state (COMIN_RCV_DATA state) and entering the verification state (COMIN_VERIFY state) after the selected cellular communications device receives the predetermined number of command pages and in response to receiving one of the pages having a portion that matches the first mask and a least significant digit representing a verification command;

verifying the received data while the selected cellular communications device is in the verification state by comparing a verification term of the verification command page with a value calculated based on the data provided by the command page; and operating on the received data in accordance with the command in response to verifying the received data.

26. The method of claim 25, wherein one of the pages containing the command is formatted to represent a telephone number (MIN) having a set of digits in the format ABCDEddddx, wherein a portion of the digits correspond to the predetermined characteristic (ABCDE), another portion of the digits corresponds to data, and a remaining least significant digit represents the command.

27. The method of claim 25, wherein each cellular communications device includes non-volatile memory containing the first mask (COMIN_12 mask) and at least one of the second masks (MIN mask).

28. The method of claim 25 further comprising the step of discarding the data in the event that any one of the following events occurs: (1) a verification value of the verification command page does not match a verification term calculated with the combined data of the data sequence; (2) the verification command page is not received within a certain predefined time period; (3) a time period between any pair of received command pages exceeds a certain maximum time period; and more than a predetermined number of pages containing the command is received while the selected cellular communications device is monitoring the cellular network control channel.

29. The method of claim 25, wherein the page having the predetermined characteristic is formatted to represent at least a portion of a telephone number (MIN) for the CMR system; and the command page is formatted to represent a telephone number having a plurality of digits, wherein certain digits of the telephone number represent the predetermined characteristic, other digits of the telephone number that represent data values and a remaining digit of the telephone number that identifies the action associated with the command.

30. In or for a cellular mobile radiotelephone (CMR) system having an array of cells, a data message system for communicating selected data collected from a plurality of remote data sources, said data message system comprising:

a plurality of data reporting devices, each of said data reporting devices operative for monitoring a corresponding one of said remote data sources to obtain said selected data and for transmitting a data message containing said selected data, said data message formatted to correspond to an identification signal that is transmitted by a cellular radiotelephone when said cellular radiotelephone first identifies itself to said CMR system;

a mobile switching center (MSC) for receiving said data message via a cellular network control channel from each of said data reporting devices operating within coverage areas of said array of cells; and data collection system for collecting said selected data in response to receiving said data message from said MSC via a first communications link;

said MSC further operative to transmit pages via the cellular network control channel, wherein selected pages contain a data set that forms a portion of a data sequence;

said data reporting devices further operative to monitor the cellular network control channel for one of the pages having a specific identifier assigned to a selected one of the data reporting devices in response to receiving one of the pages having a predetermined characteristic, said selected data reporting device operative to monitor the cellular network control channel for pages containing a command in response to receiving the page having the specific identifier, and responsive to receiving a predetermined number of pages containing the command, said selected data reporting device further operative to accept the data set from each of the predetermined number of pages to form an aggregate data message containing the data sequence.

31. The system of claim 30 wherein the selected data reporting device monitors the FOCC for one of the pages containing a command corresponding to a verification action in response to receiving the predetermined number of pages, verifies the data sequence of the aggregate data message in response to receiving the verification page, and processes the data sequence in accordance with the command in response to verifying the data sequence.

32. The system of claim 31 wherein the selected data reporting device discards the data in the event that (1) a verification value of the other command page does not match a verification term calculated with the combined data of the data sequence or (2) the verification command page is not received within a certain predefined time period.

33. The system of claim 31 wherein the selected data reporting device discards the data in the event that a time period between any pair of received command pages exceeds a certain maximum time period.

34. The system of claim 31 wherein the selected data reporting device discards the data in response to receiving more than a predetermined number of pages containing the command while monitoring the cellular network control channel.

35. The system of claim 30, wherein the page having the predetermined characteristic is formatted to represent at least a portion of a telephone number (MIN) for the CMR system; and the page containing the command is formatted to represent a telephone number having a plurality of digits, certain digits of the telephone number that represent the predetermined characteristic, other digits of the telephone number that represent data values and the remaining digit of the telephone number that identifies the action associated with the command.

36. A method for communicating with a plurality of cellular communications devices by sending a multiple pages via a cellular network control channel of a cellular mobile radiotelephone (CMR) system, comprising the steps of:

monitoring the cellular network control channel for one of the pages having a predetermined characteristic;

monitoring the cellular network control channel for pages containing a command in response to receiving the page having the predetermined characteristic; and responsive to receiving pages containing the command, combining data from each of the predetermined number of pages to form an aggregate data message containing a sequence of the data.

37. The method of claim 36 further comprising the steps of:

monitoring the cellular network control channel for one of the pages containing another command in response to receiving the command pages;

verifying the data sequence of the aggregate data message in response to receiving the page containing the other command.

38. The method of claim 37 further comprising the step of discarding the data sequence in the event that a verification term of the other command page does not match a verification value calculated with the combined data of the data sequence.

39. The method of claim 37 further comprising the step of discarding the data sequence in the event that the other command page is not received within a certain maximum time period.

40. The method of claim 37 further comprising the step of discarding the data sequence in the event that a time period between any pair of received command pages exceeds a certain maximum time period.

41. The method of claim 37 further comprising the step of discarding the data sequence in response to receiving more than a predetermined number of pages containing the command while monitoring the cellular network control channel.

42. The method of claim 37 further comprising the step of responding to the verification of the data sequence by operating on the data sequence in accordance with the command.

43. The method of claim 36, wherein the data combining step comprises ordering the data of each received command page based on the arrival of the corresponding command page at the selected cellular communication device.

44. The method of claim 36, wherein the data combining step comprises ordering each received command page in sequential order based on a numerical value contained in each command page.

45. The method of claim 36, wherein the step of receiving one of the pages having a predetermined characteristic comprises the steps of:

comparing at least a portion of the received page having the predetermined characteristic to a mask stored in memory of each cellular communications device; and accepting the page in the event that the portion of the page matches the mask.

46. The method of claim 45, wherein the page having the predetermined characteristic is formatted to represent at least a portion of a unique telephone number (MIN).

47. The method of claim 36, wherein the page containing a command comprises a telephone number (MIN) having a plurality of digits, the command page having a format comprising certain digits that represent the predetermined characteristic, other digits that represent data values and a remaining digit that identifies the action associated with the command.

48. The method of claim 36 further comprising the steps of verifying the data provided by a predetermined number of pages containing the command by calculating a verification value in response to receiving a page containing another command, the calculation comprising the steps of:

summing each digit pair for the data of each page containing the command to produce a hex value-sum of all pages containing the command;

exclusive oring the second least significant digit pair of the first page containing the command with the hex-value sum of all pages containing the command to produce a exclusive-or'ed sum, converting the exclusive-or'ed sum into a decimal value to provide a calculated verification value; and comparing the calculated verification value to a verification term contained in a page containing another command.

49. For a cellular mobile radiotelephone (CMR) system, a method for communicating data between an mobile switching center (MSC) and cellular communications devices operating within the scope of coverage for the CMR system, comprising the steps of:

transmitting a data message containing selected data via a reverse overhead control channel (RECC) of a cellular network control channel to an MSC of said CMR system, said MSC operative to receive said data message and to send multiple pages via the forward overhead control channel (FOCC) of the cellular network control channel;

transmitting said data message from said MSC to a data collection system via a first communications link, said data collection system operative to collect said selected data in response to said data message;

monitoring the FOCC for one of the pages having a predetermined characteristic;

monitoring the FOCC for pages containing a command in response to receiving the page having the predetermined characteristic; and responsive to receiving a predetermined number of pages containing the command, accepting data from each of the predetermined number of pages to form an aggregate data message containing a sequence of the data.

50. The method of claim 49 further comprising the steps of:

monitoring the FOCC for one of the pages containing a command corresponding to a verification action in response to receiving the predetermined number of pages;

verifying the data sequence of the aggregate data message in response to receiving the verification page; and operating on the data sequence in accordance with the command in response to verifying the data sequence.

51. The method of claim 49, wherein the page having the predetermined characteristic is formatted to represent at least a portion of a telephone number (MIN); and the page containing a command is formatted as a telephone number having a plurality of digits, certain digits that represent the predetermined characteristic, other digits that represent data values and a remaining digit that identifies the action associated with the command.

52. The method of claim 49, wherein the step of monitoring the cellular network control channel for one of the pages having a specific identifier assigned to the selected cellular communications device comprises:

monitoring the cellular network channel for a certain time period after receiving one of the pages having the predetermined characteristic; and terminating the monitoring step in the event that the certain time period expires without receiving one of the pages having the specific identifier.

* * * * *